United States Patent
Vats

(10) Patent No.: US 9,911,243 B2
(45) Date of Patent: Mar. 6, 2018

(54) REAL-TIME CUSTOMIZATION OF A 3D MODEL REPRESENTING A REAL PRODUCT

(71) Applicant: Nitin Vats, Uttar Pradesh (IN)

(72) Inventor: Nitin Vats, Uttar Pradesh (IN)

( * ) Notice: Subject to any disclaimer, the term of this patent is extended or adjusted under 35 U.S.C. 154(b) by 0 days.

(21) Appl. No.: 15/126,528

(22) PCT Filed: Mar. 16, 2015

(86) PCT No.: PCT/IN2015/000129
§ 371 (c)(1),
(2) Date: Sep. 15, 2016

(87) PCT Pub. No.: WO2015/140815
PCT Pub. Date: Sep. 24, 2015

(65) Prior Publication Data
US 2017/0103584 A1    Apr. 13, 2017

(30) Foreign Application Priority Data

Mar. 15, 2014 (IN) .............................. 426/DEL/2014

(51) Int. Cl.
*G06T 19/20* (2011.01)
*G06T 15/04* (2011.01)
(Continued)

(52) U.S. Cl.
CPC .......... *G06T 19/20* (2013.01); *G02B 27/0172* (2013.01); *G06F 3/14* (2013.01);
(Continued)

(58) Field of Classification Search
CPC . G06T 19/20; G06T 15/04; G06T 2219/2021; G06T 2219/2016;
(Continued)

(56) References Cited

U.S. PATENT DOCUMENTS 9,129,433 B1 * 9/2015 Korobkin ................ G06T 17/10
2001/0056308 A1 * 12/2001 Petrov ..................... G06T 17/20
700/98

(Continued)

*Primary Examiner* — Maurice L McDowell, Jr.
(74) *Attorney, Agent, or Firm* — Crose Law LLC; Bradley D. Crose

(57) ABSTRACT

A computer implemented method for visualization of a 3D model of an object, wherein the method includes:
generating and displaying a first view of the 3D-model;
receiving an user input, the user input are one or more interaction commands comprises interactions for customization of 3D model by at least one of adding, removing, replacing, scaling, or changing geometry, or combination thereof, of mechanical, electronic, digital, or pneumatic part/s of the 3D model by changing texture and/or graphics data of the part
identifying one or more interaction commands;
in response to the identified command/s, rendering of corresponding interaction to 3D model of object with or without sound output using texture data, computer graphics data and selectively using sound data of the 3D-model of object; and
displaying the corresponding interaction to 3D-model.

24 Claims, 24 Drawing Sheets

(51) Int. Cl.
*G06F 3/16* (2006.01)
*G06F 3/14* (2006.01)
*G10L 15/22* (2006.01)
*G10L 15/18* (2013.01)
*G10L 13/08* (2013.01)
*G02B 27/01* (2006.01)
*G06F 3/0481* (2013.01)
*G06F 3/0484* (2013.01)
*G06F 3/0482* (2013.01)

(52) U.S. Cl.
CPC ............ *G06F 3/167* (2013.01); *G06T 15/04* (2013.01); *G10L 13/08* (2013.01); *G10L 15/18* (2013.01); *G10L 15/22* (2013.01); *G02B 2027/014* (2013.01); *G02B 2027/0138* (2013.01); *G06F 3/0482* (2013.01); *G06F 3/04815* (2013.01); *G06F 3/04845* (2013.01); *G06T 2219/2016* (2013.01); *G06T 2219/2021* (2013.01); *G10L 2015/223* (2013.01)

(58) Field of Classification Search
CPC ........ G02B 27/0172; G02B 2027/0138; G02B 2027/014; G10L 13/08; G10L 15/18; G10L 15/22; G10L 2015/223; G06F 3/14; G06F 3/167; G06F 3/0482; G06F 3/04845; G06F 3/04815
See application file for complete search history.

(56) References Cited

U.S. PATENT DOCUMENTS

| | | | |
|---|---|---|---|
| 2002/0010655 A1* | 1/2002 | Kjallstrom | G06Q 30/02 705/26.62 |
| 2010/0277468 A1* | 11/2010 | Lefevre | G06T 15/00 345/419 |
| 2015/0002509 A1* | 1/2015 | Rohaly | G06T 15/10 345/420 |

* cited by examiner

REAL-TIME CUSTOMIZATION OF A 3D MODEL REPRESENTING A REAL PRODUCT

FIELD OF INVENTION

The invention relates to visualizing a 3D model. More specifically, the invention relates to visualizing and interacting with the 3D model.

BACKGROUND OF THE INVENTION

There is an increasing trend to display the real products digitally with the help of images, videos and/or animations. However, there exists a difficulty for users to know about variations or customization options available with a manufacturer for a particular version of real object such as a model of car and a lot of time and effort is required to gain such information. Further, even if users become aware of customization possibilities for a product, it becomes challenging to visualize and know, how the customization will look like, before making any buying decision or before modifying an existing product. Even in real situation, when users visit a physical establishment, all customized options are rarely available for visualization. Again, if a user wants to further modify a real object such as automotive vehicle like bike or car as per his taste, such customization possibilities in a system in real-time with a real looking 3D model representing a real object, for realistic visualization and user-controlled interaction with the 3D model, where further interaction with the modified or customized model can be performed is a challenging task and lacking in existing systems.

In some implementation, such as websites/systems offering car customization such as 3Dtuning.com, ford.com are built in Adobe® Flash® using images and show product in 2D graphics environment. However, clear interior view of the product is not available for customization and visualization, and further performing any kind of interaction with the replaced part is challenging. User-controlled realistic interaction such as viewing softness property of replaced seats, rotations in 360 degree in all planes, moving or adjusting replaced parts such as seats with the customized part or car, is lacking.

The object of the invention is to provide an easy to use solution for carrying out real-time customization of objects using a realistic 3D model of the real object.

SUMMARY OF THE INVENTION

The object of the invention is achieved by method of claim 1, system of claim 29 and a computer program product of claim 30.

According to one embodiment of the method, the method includes:
- generating and displaying a first view of the 3D-model;
- receiving an user input, the user input are one or more interaction commands comprises interactions for customization of 3D model by at least one of adding, removing, replacing, scaling, or changing geometry, or combination thereof, of mechanical, electronic, digital, or pneumatic part/s of the 3D model by changing texture and/or graphics data of the part
- identifying one or more interaction commands;
- in response to the identified command/s, rendering of corresponding interaction to 3D model of object with or without sound output using texture data, computer graphics data and selectively using sound data of the 3D-model of object; and
- displaying the corresponding interaction to 3D-model.

According to another embodiment of the method, wherein customization by adding comprises adding one or more new part/s to the 3D model at a predefined appropriate position.

According to yet another embodiment of the method, wherein customization by replacing and/or removing is performed on a predefined part/s.

According to one embodiment of the method, wherein customization by scaling is performed on a predefined part and/or to a predefined limit.

According to another embodiment of the method, wherein the part of 3D model can be customized by shape in particular geometry of predefined options.

According to yet another embodiment of the method, wherein the 3D-model after customization is adapted to behave as an entity, in the same way as the 3D model was behaving before customization, so as the 3D model after customization is viewable from all angles.

According to one embodiment of the method, wherein the customization is adapted to be performed in any angular orientation of the 3D model.

According to another embodiment of the method, wherein the interaction command comprises extrusive interaction and/or intrusive interactions and/or a time bound change based interaction and/or a real environment mapping based interaction and combination thereof, as per user choice and/or as per characteristics, state and nature of the said object, wherein the time bound changes refers to representation of changes in 3D model demonstrating change in physical property of object in a span of time on using or operating of the object, and real environment mapping refers to capturing a real time environment, mapping and simulating the real time environment to create a simulated environment for interacting with the 3D model.

According to yet another embodiment of the method, wherein the interaction commands are adapted to be received before customization and/or during customization and/or after customization.

According to one embodiment of the method, wherein the extrusive interaction comprises at least one of:
- interacting with a 3D model representing an object having a display for experiencing functionality of Virtual GUI on virtual display of displayed 3D model; to produce the similar changes in corresponding GUI of 3D model as in GUI of the object for similar input;
- interacting for operating and/or removing movable parts of the 3D model of the object, wherein operating the movable parts comprises sliding, turning, angularly moving, opening, closing, folding, and inflating-deflating the parts
- interacting with 3D model of object for rotating the 3D model in 360 degree in different planes;
- operating the light-emitting parts of 3D-model of object for experiencing functioning of the light emitting part/s, the functioning of the light emitting part/s comprises glowing or emission of the light from light emitting part/s in 3D-model in similar pattern that of light emitting part/s of the object;
- interacting with 3D-model of object having representation of electronic display part/s of the object to display response in electronic display part of 3D-model similar to the response to be viewed in electronic display part/s of the object upon similar interaction;

interacting with 3D-model of object having representation of electrical/electronic control of the object to display response in the 3D-model similar to the response to be viewed in the object upon similar interaction;

interacting with 3D-model for producing sound effects; or combination thereof.

According to another embodiment of the method, wherein functioning of light emitting part is shown by a video as texture on surface of said light emitting part to represent lighting as dynamic texture change.

According to yet another embodiment of the method, the intrusive interactions comprises at least one of:

interacting with sub-parts of the 3D-model of the object, wherein sub-parts are those parts of the 3D-model which are moved and/or slided and/or rotated and/or operated for using the object;

interacting with internal parts of the 3D model, wherein the internal parts of the 3D-model represent parts of the object which are responsible for working of object but not required to be interacted for using the object, wherein interacting with internal parts comprising removing and/or disintegrating and/or operating and/or rotating of the internal parts;

interacting for receiving an un-interrupted view of the interior of the 3D model of the object and/or the sub-parts;

interacting with part/s of the 3D model for visualizing the part by dismantling the part from the entire object;

interacting for creating transparency-opacity effect for converting the internal part to be viewed as opaque and remaining 3D model as transparent or nearly transparent;

disintegrating different parts of the object in exploded view; or combination thereof.

According to yet another embodiment of the method, wherein the real environment mapping based interactions comprises at least one of:

capturing an area in vicinity of the user, mapping and simulating the video/image of area of vicinity on a surface of 3D model to provide a mirror effect;

capturing an area in vicinity of the user, mapping and simulating the video/image of area of vicinity on a 3D space where 3D model is placed; or combination thereof.

According to one embodiment of the method, wherein the interaction comprises liquid and fumes flow based interaction for visualizing liquid and fumes flow in the 3D model with real-like texture in real-time.

According to another embodiment of the method, wherein the interaction comprises immersive interactions, the immersive interactions are defined as interactions where users visualize their own body performing user-controlled interactions with the virtual computer model.

According to yet another embodiment of the method, wherein displaying of new interaction/s to the 3D-model while previously one or more interaction has been performed or another interaction/s is being performed on the 3-D model.

According to one embodiment of the method, wherein rendering of corresponding interaction to 3D model of object in a way for displaying in a display system made of one or more electronic visual display or projection based display or combination thereof.

According to another embodiment of the method, wherein the display system is a wearable display or a non-wearable display or combination thereof.

According to yet another embodiment of the method, wherein the non-wearable display comprises electronic visual displays such as LCD, LED, Plasma, OLED, video wall, box shaped display or display made of more than one electronic visual display or projector based or combination thereof.

According to one embodiment of the method, wherein the non-wearable display comprises a pepper's ghost based display with one or more faces made up of transparent inclined foil/screen illuminated by projector/s and/or electronic display/s wherein projector and/or electronic display showing different image of same virtual object rendered with different camera angle at different faces of pepper's ghost based display giving an illusion of a virtual object placed at one places whose different sides are viewable through different face of display based on pepper's ghost technology.

According to another embodiment of the method, wherein the wearable display comprises head mounted display, the head mount display comprises either one or two small displays with lenses and semi-transparent mirrors embedded in a helmet, eyeglasses or visor. The display units are miniaturised and may include CRT, LCDs, Liquid crystal on silicon (LCos), or OLED or multiple micro-displays to increase total resolution and field of view.

According to yet another embodiment of the method, wherein the head mounted display comprises a see through head mount display or optical head-mounted display with one or two display for one or both eyes which further comprises curved mirror based display or waveguide based display.

According to one embodiment of the method, wherein the head mounted display comprises video see through head mount display or immersive head mount display for fully 3D viewing of the 3D-model by feeding rendering of same view with two slightly different perspective to make a complete 3D viewing of the 3D-model.

According to another embodiment of the method, wherein the 3D model moves relative to movement of a wearer of the head-mount display in such a way to give to give an illusion of 3D model to be intact at one place while other sides of 3D model are available to be viewed and interacted by the wearer of head mount display by moving around intact 3D model.

According to yet another embodiment of the method, wherein the display system comprises a volumetric display to display the 3D model and interaction in three physical dimensions space, create 3-D imagery via the emission, scattering, beam splitter or through illumination from well-defined regions in three dimensional space, the volumetric 3-D displays are either auto stereoscopic or auto multiscopic to create 3-D imagery visible to an unaided eye, the volumetric display further comprises holographic and highly multiview displays displaying the 3D model by projecting a three-dimensional light field within a volume.

According to one embodiment of the method, wherein the display system comprises more than one electronic display/projection based display joined together at an angle to make an illusion of showing the 3D model inside the display system, wherein the 3D model is parted off in one or more parts, thereafter parts are skew in shape of respective display and displaying the skew parts in different displays to give an illusion of 3d model being inside display system.

According to another embodiment of the method, wherein the input command is received from one or more of a pointing device such as mouse; a keyboard; a gesture guided input or eye movement or voice command captured by a sensor, an infrared-based sensor; a touch input; input received by changing the positioning/orientation of accelerometer and/or gyroscope and/or magnetometer attached with wearable display or with mobile devices or with moving display; or a command to a virtual assistant.

According to yet another embodiment of the method, wherein command to the said virtual assistant system is a voice command or text or gesture based command, wherein virtual assistant system comprises a natural language processing component for processing of user input in form of words or sentences and artificial intelligence unit using static/dynamic answer set database to generate output in voice/text based response and/or interaction in 3D model.

BRIEF DESCRIPTION OF THE DRAWINGS

FIG. 6(a) to FIG. 6(c) illustrates an example of the invention where a control panel of virtual table fan is replaced while keeping the fan on.

DETAILED DESCRIPTION

Figure 1A:
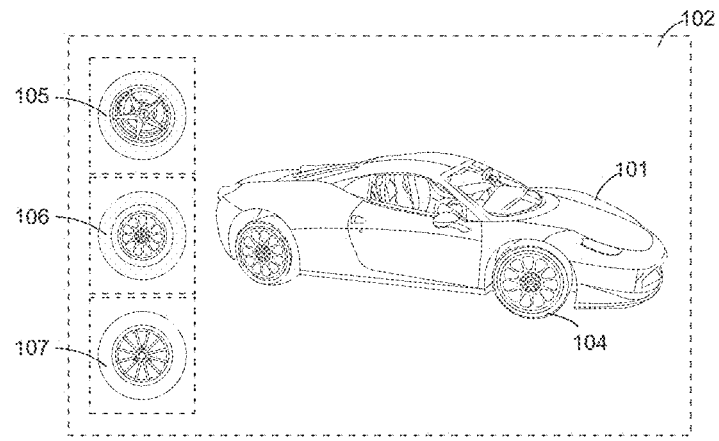
FIG. 1(a) to FIG. 1(c) illustrates an example of the invention where wheels of virtual car are customized.
Figure 1B:
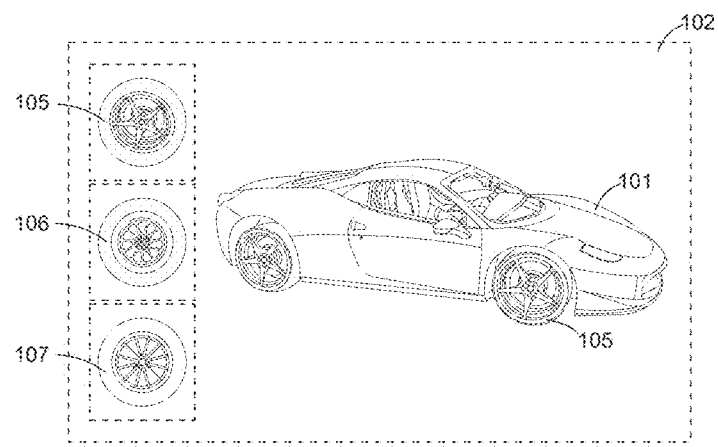
Figure 1C:
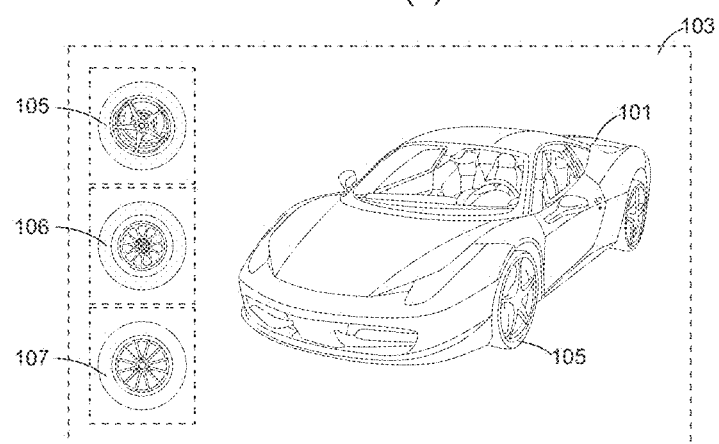

FIG. 1(a) to FIG. 1(c) illustrates an example of the invention where wheels of virtual car 101 are customized.

FIG. 1(a) shows a virtual car 101 placed in a particular orientation 102 with front wheel 104 of the car 101. Also, various options of wheel 106, 107, 108 are shown. User selects wheel 105 from the options in FIG. 1(b) and replaces the front wheel 104. In FIG. 1(c), the virtual car 101 is interacted to change orientation of car from 102 to 103. The virtual car 101 can be both in 2D or 3D and the customization of the wheel requires change in texture and graphics of the front wheel of the virtual car 101. The virtual car 101 can be interacted to be rotated in 360 degrees.

Figure 2A:
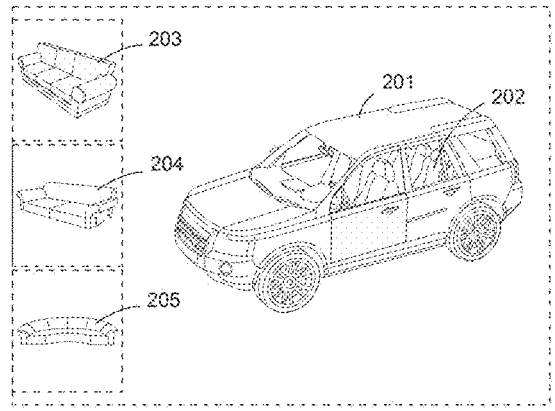
FIG. 2(a) to FIG. 2(c) illustrates an example of the invention where seat of virtual car is customized with a sofa.
Figure 2B:
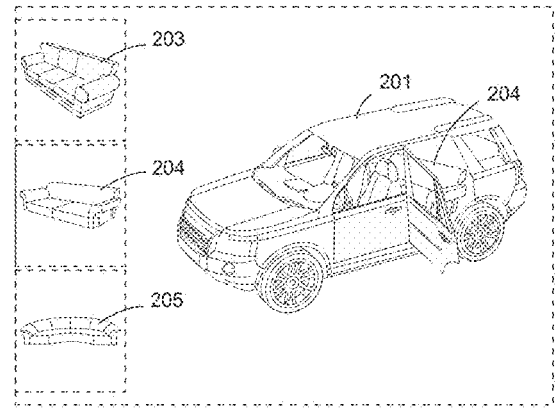
Figure 2C:
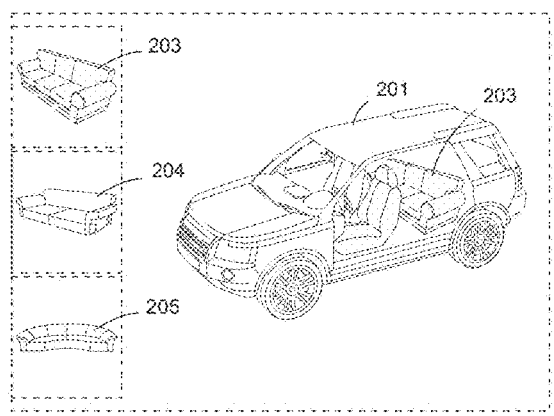

FIG. 2(a) to FIG. 2(c) illustrates an example of the invention where seat 202 of virtual car 201 is customized with another seat 203, 204, 205. FIG. 2(a) shows the virtual car 201 having a back seat 202. Also, some customization option for back seat 202 with another seat 203, 204, 205 are shown. A user opens back gate of the virtual car and selects seat 204 as an option for replacing the back seat 202 in FIG. 2(b). In FIG. 2(c) a front gate, as well as back gate are removed from the virtual car 201 to have a better view of interior of the virtual car 201.

Figure 3A:
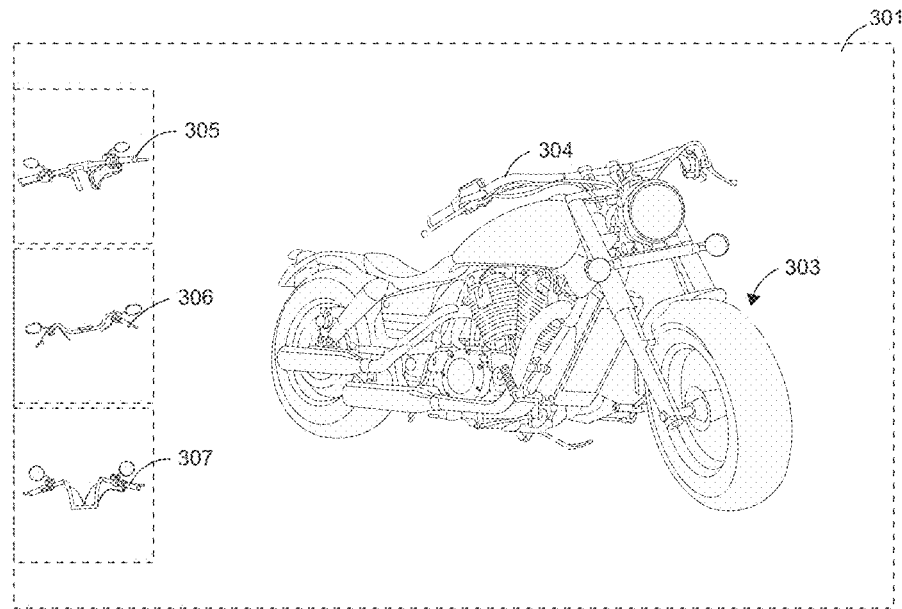
FIG. 3(a) to 3(f) illustrates an example of the invention where handle of a virtual motorcycle is customized and performing functionality on the customized handle.
Figure 3B:
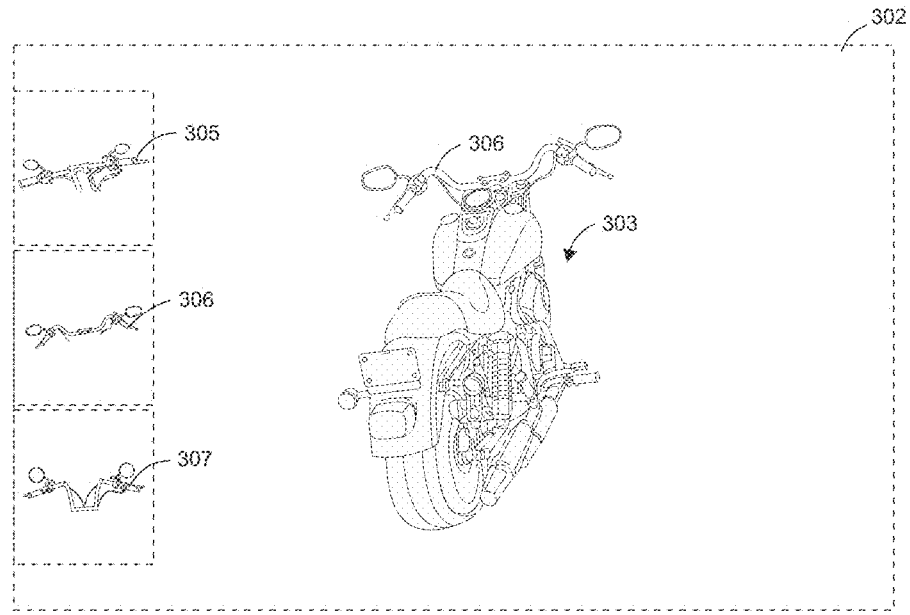
Figure 3C:
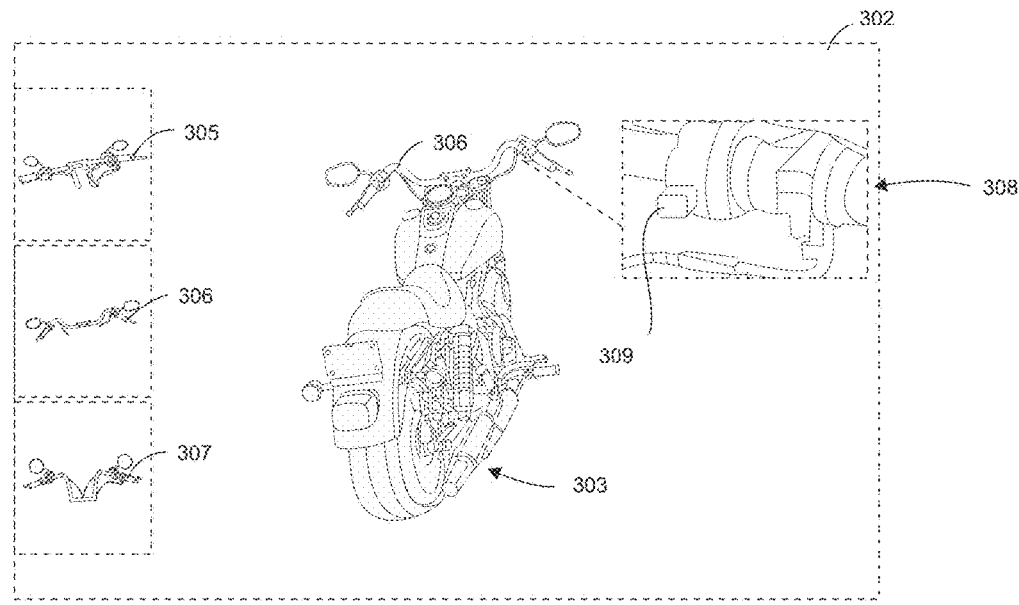
Figure 3D:
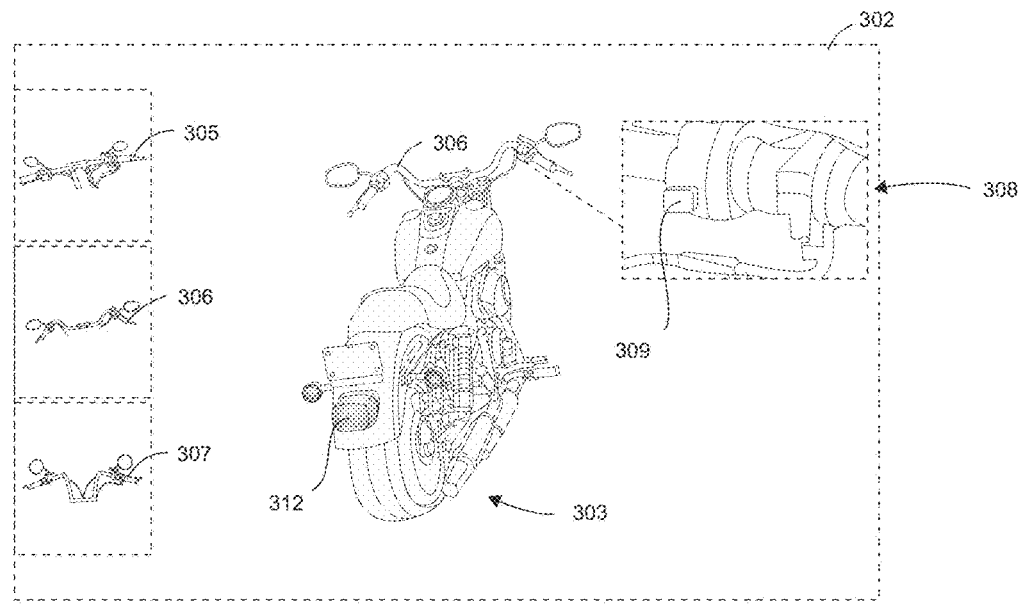
Figure 3E:
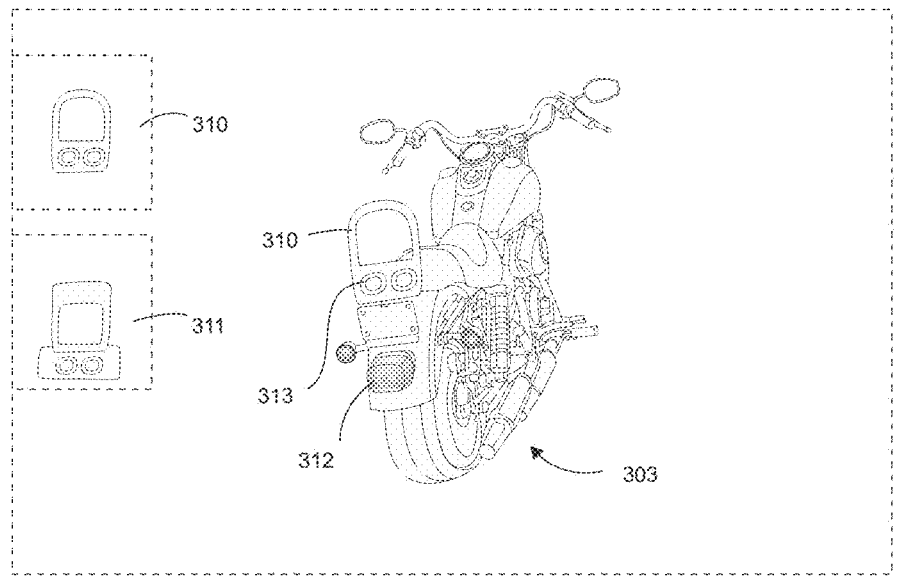
Figure 3F:
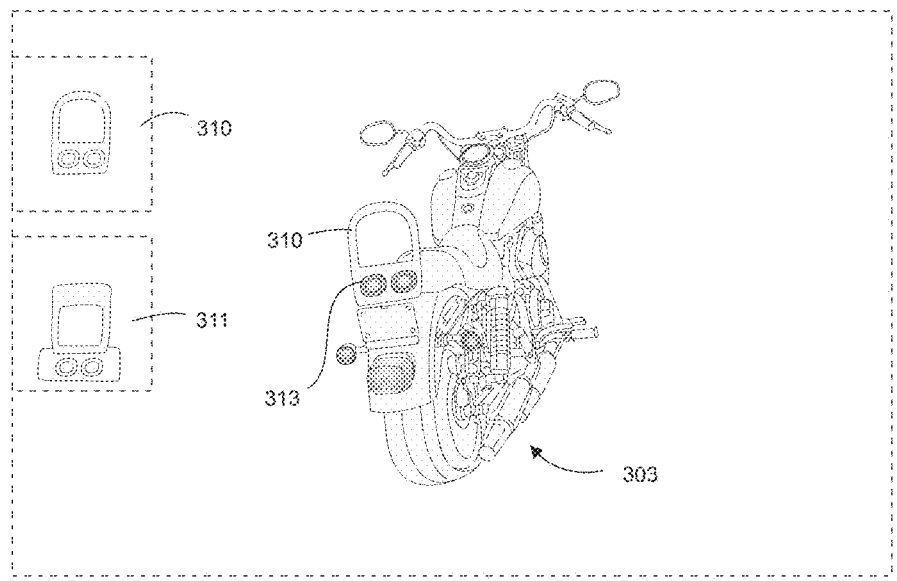

FIG. 3(a) to 3(f) illustrates an example of the invention where handle 304 of a virtual motorcycle 303 is customized and performing functionality on the customized handle. In FIG. 3(a), the virtual motorcycle 303 is shown in an orientation 301 having handle 304. Also, shown are options 305, 306, 307 to customize the handle 304. In FIG. 3(b), a user rotates the virtual motorcycle 303 to a different orientation 302. The virtual motorcycle 303 can be rotated 360 degrees in any orientation. Also, the user selects option 306 for changing the handle of the virtual motorcycle 303. In FIG. 3(c), part 308 of the handle 306 is shown enlarged and the user operates back light by switching on the back light using switch 309 shown in the enlarged part 308 of the handle 306. In FIG. 3 (d) shows switching on of the back light 312. In FIG. 3(e) shows options 310, 311 for back support to be added as an accessory to the virtual motorcycle. User selects option 310 for back support and same is added at an appropriate place on the virtual motorcycle 303. In FIG. 3(f) shows switching on of lights 313 of the back support after the customization.

Figure 4A:
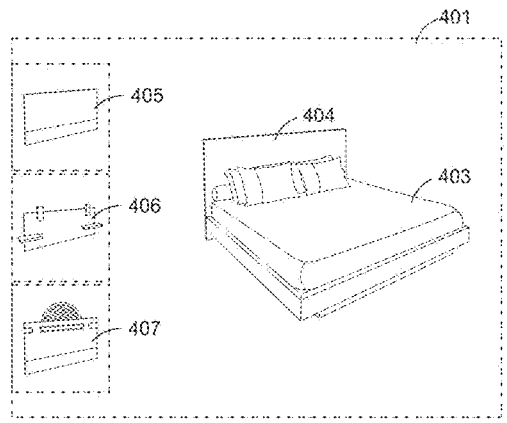
FIG. 4(a) to FIG. 4(f) illustrates an example of the invention where headrest of virtual bed is customized along with changing geometry of the customized headrest.
Figure 4B:
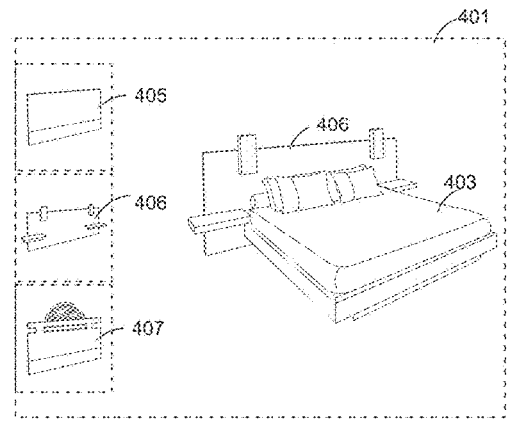
Figure 4C:
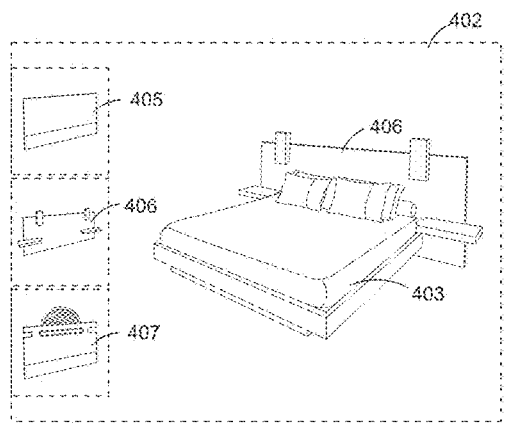
Figure 4D:
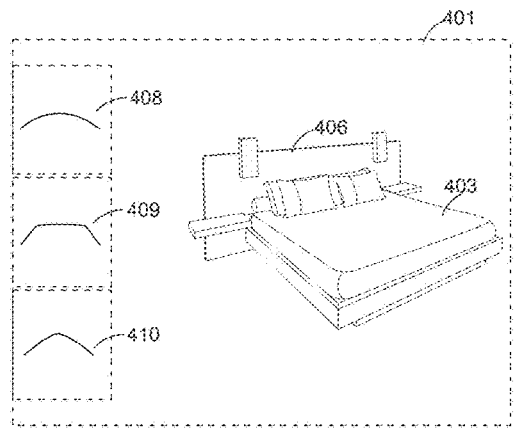
Figure 4E:
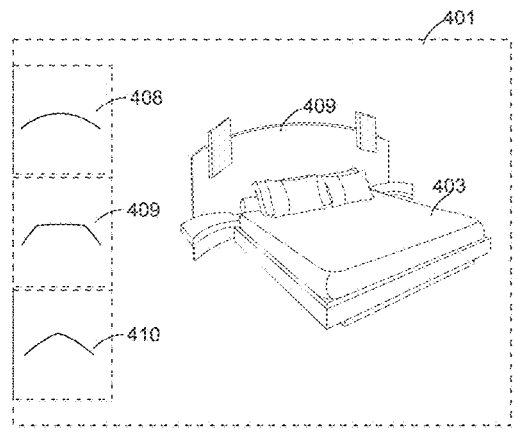
Figure 4F:
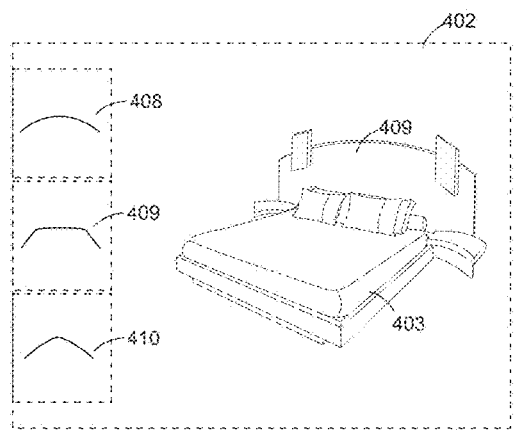

FIG. 4(a) to FIG. 4(f) illustrates an example of the invention where headrest 404 of virtual bed 403 is customized along with changing geometry of the customized headrest. In FIG. 4(a), the virtual bed 403 is shown with headrest 404 placed in an orientation 401. Also shown are the options 405, 406, 407 for change in current headrest 404. User selects option 406 for changing the headrest and the changed headrest 406 is shown in FIG. 4(b). In FIG. 4(c), the user rotates the virtual bed 403 to a different orientation 402. The virtual bed 403 can be rotated 360 degrees in any orientation. FIG. 4(d) shows various options 408, 409, 410 to customize geometry of the headrest 406. User selects the option 408 to change the geometry of the headrest 406. The changed headrest 409 is shown in the FIG. 4(e). In FIG. 4(f), the user rotates the virtual bed 403 to a different orientation 402 after customizing the geometry of the headrest.

Figure 5A:
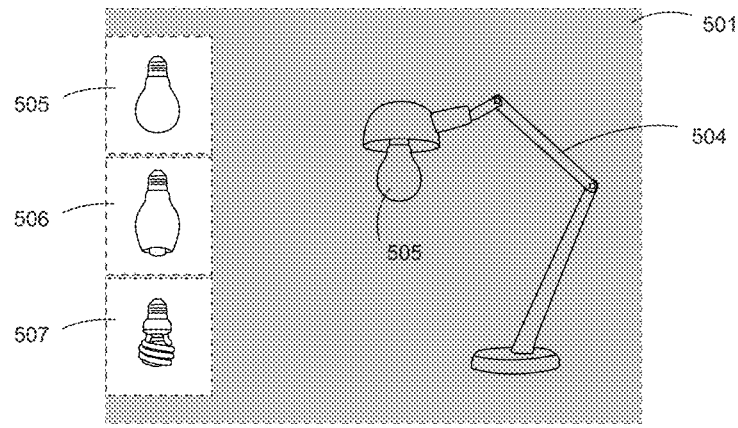
FIG. 5(a) to FIG. 5(c) illustrates an example of the invention where bulb of virtual lamp is replaced along with change in illumination pattern of the replaced bulb.
Figure 5B:
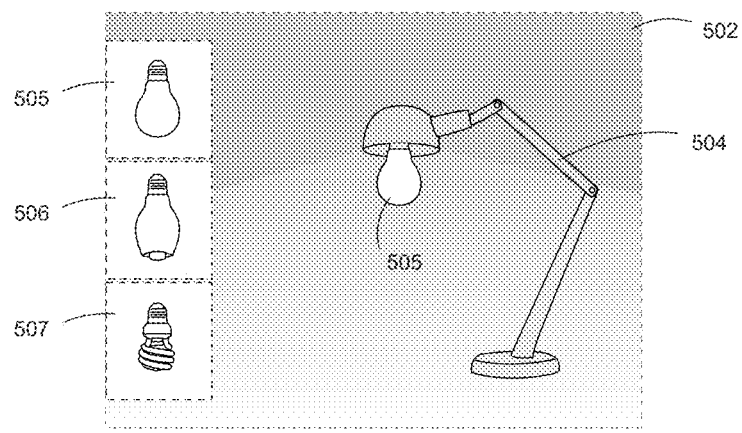
Figure 5C:
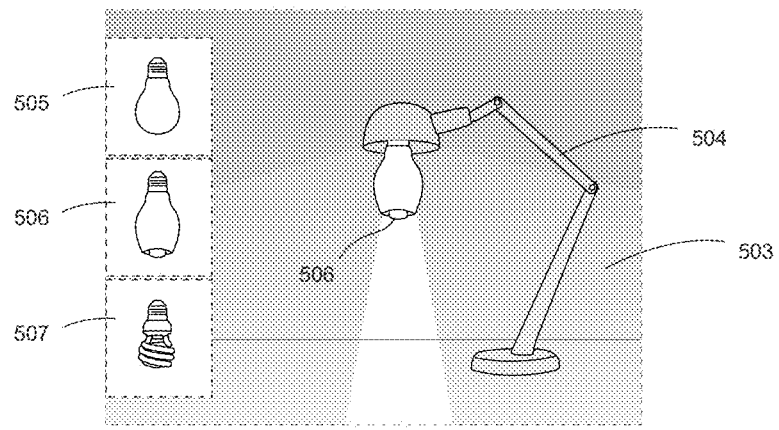

FIG. 5(a) to FIG. 5(c) illustrates an example of the invention where bulb of virtual lamp 504 is replaced along with change in illumination pattern of the replaced bulb. In FIG. 5(a), the virtual lamp 504 is shown along with various options 505, 506, 507 to replace bulb 505 of the virtual lamp 504. Currently, the bulb 505 is off and the environment is not illuminated 501. In FIG. 5(b), the bulb 505 is switched on and the environment is illuminated with a particular illumination pattern 502. In FIG. 5(c), the bulb 505 is replaced with option 506, in a switched on position, such that illumination pattern is changed from previous illumination pattern 502 to new illumination pattern 503.

Figure 6A:
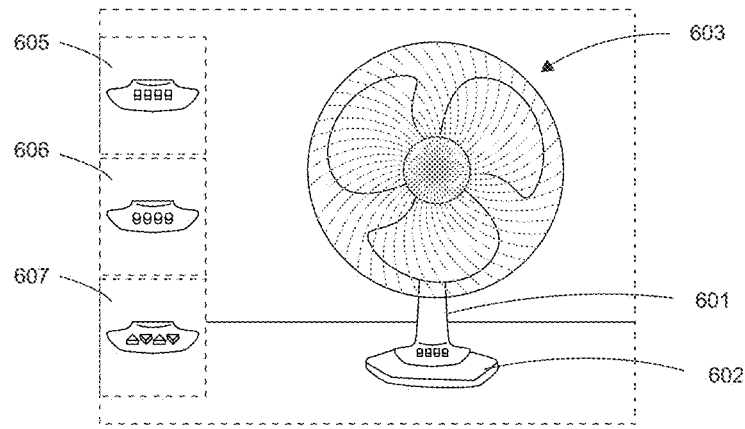
Figure 6B:
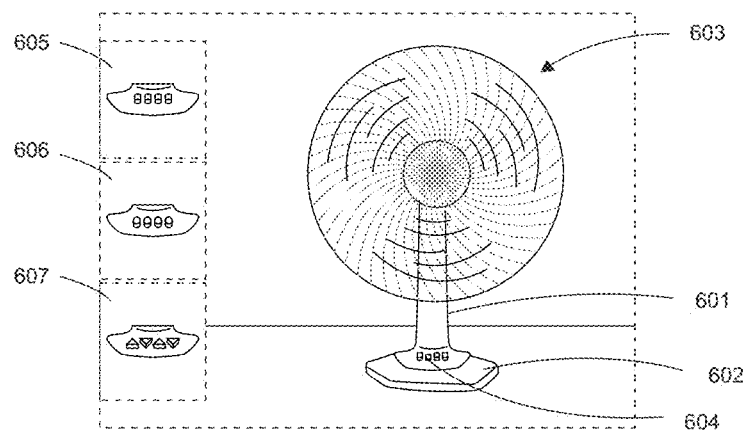
Figure 6C:
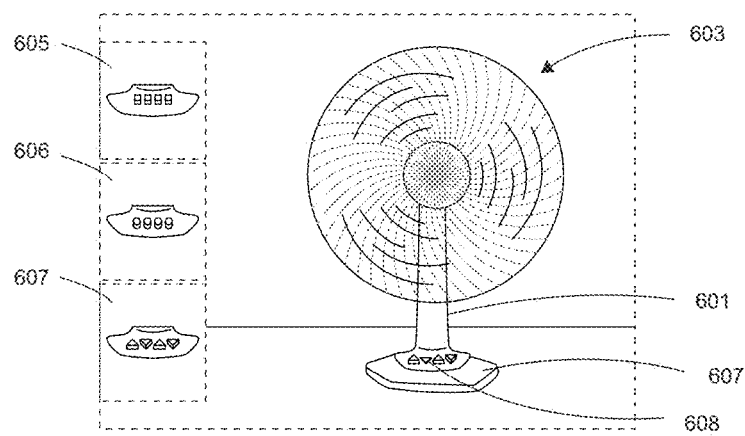

FIG. 6(a) to FIG. 6(c) illustrates an example of the invention where a control panel 602 of virtual table fan 601 is replaced while keeping the fan on. In FIG. 6(a), the virtual fan 601 is shown with control panel 602 and feathers 603, wherein the virtual fan 601 is switched off and the feathers 603 are still. In FIG. 6(b), user switches on the virtual fan 601 by pressing switch 604 on control panel 602. In both FIG. 6(a) and FIG. 6(b), options 605, 606, 607 for changing the control panel 602 are shown. User selects the option 607 to replace the control panel, while the fan is switched on. On customization, the control panel 607 is seen with switch 608 of the control panel 607 as being switched on. During the customization process of the control panel, the virtual fan 601 is not switched off and the feather 603 can be seen rotating while replacing the control panel.

Figure 7A:
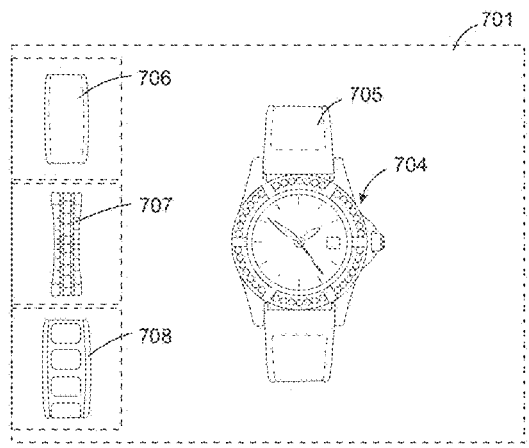
FIG. 7(a) to FIG. 7(d) illustrates an example of the invention where a wrist band of a watch is replaced.
Figure 7B:
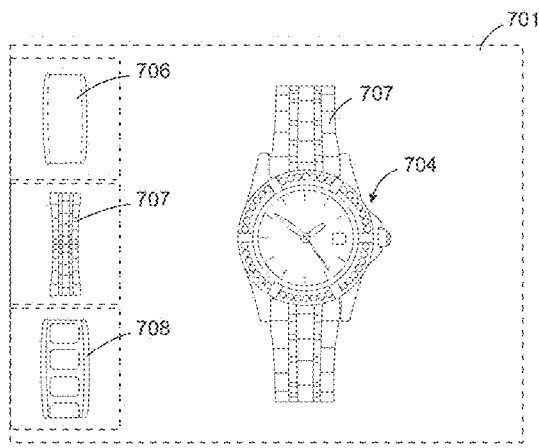
Figure 7C:
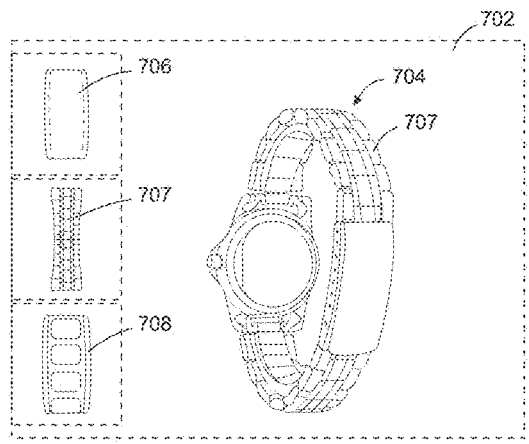
Figure 7D:
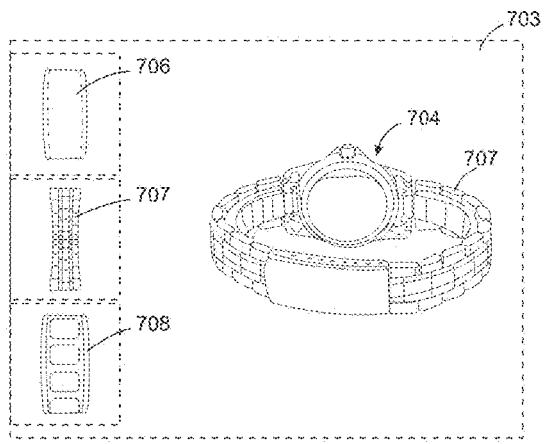

FIG. 7(a) to FIG. 7(d) illustrates an example of the invention where a wrist band 705 of a virtual watch 704 is replaced. The virtual watch 705 is shown in one orientation 701 in FIG. 7(a). Also shown are options 706, 707, 708 to customize the wrist band 705. In FIG. 7(b) user selects option 707 to replace the wrist band 705. User rotates the wrist watch 704 after customization in different planes to be in orientation 702 and 703, as shown in FIG. 7(c) and FIG. 7(d) respectively.

Figure 8A:
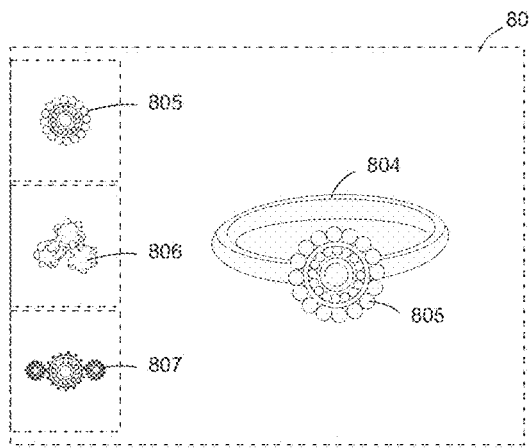
FIG. 8(a) to FIG. 8(e) illustrates an example of the invention where a virtual ring 804 is customized and scaled.
Figure 8B:
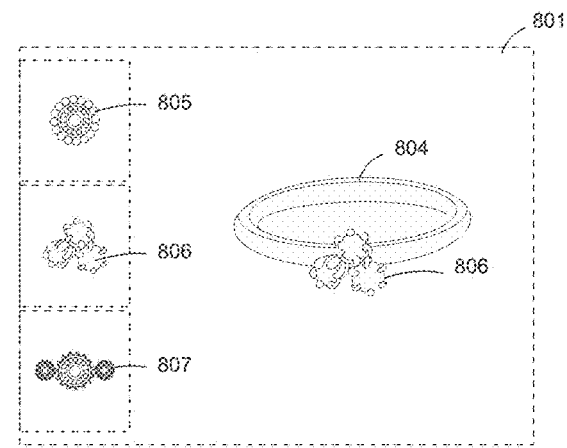
Figure 8C:
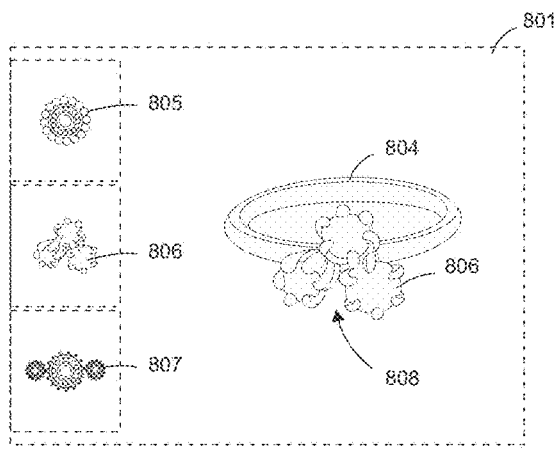
Figure 8D:
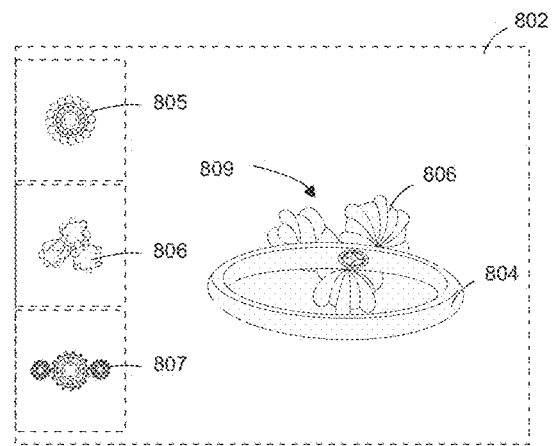
Figure 8E:
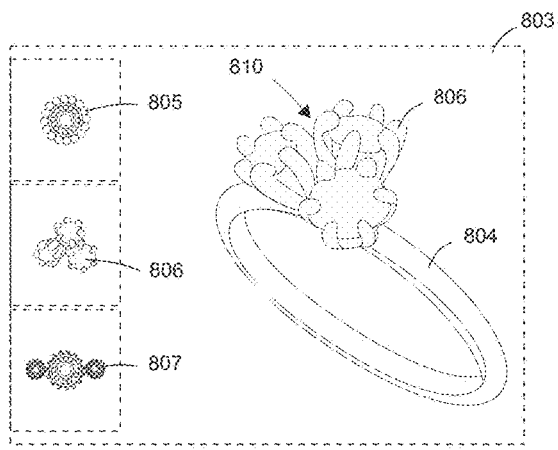

FIG. 8(a) to FIG. 8(e) illustrates an example of the invention where a virtual ring 804 is customized and scaled. In FIG. 8(a), the virtual ring 804 is shown along with its crown 805 placed in an orientation 801. Also shown are various options 805, 806, 807 to customize the crown of the virtual ring 804. Use replaces the crown 805 with option 806, as shown in FIG. 8(b). User scales the virtual ring 804 along with the new crown 806, as shown in FIG. 8(c). Further user changes orientation 802, 803 of the virtual ring 804 in FIG. 8(d) and FIG. 8(e) respectively after scaling up. With the change in orientation 801 to 802, the location of crown changes from 808 in FIG. 8(c) to 809 in FIG. 8(d), and change in orientation from 802 to 803, the location of crown changes from 809 in FIG. 8(d) to 810 in FIG. 8(e).

Figure 9A:
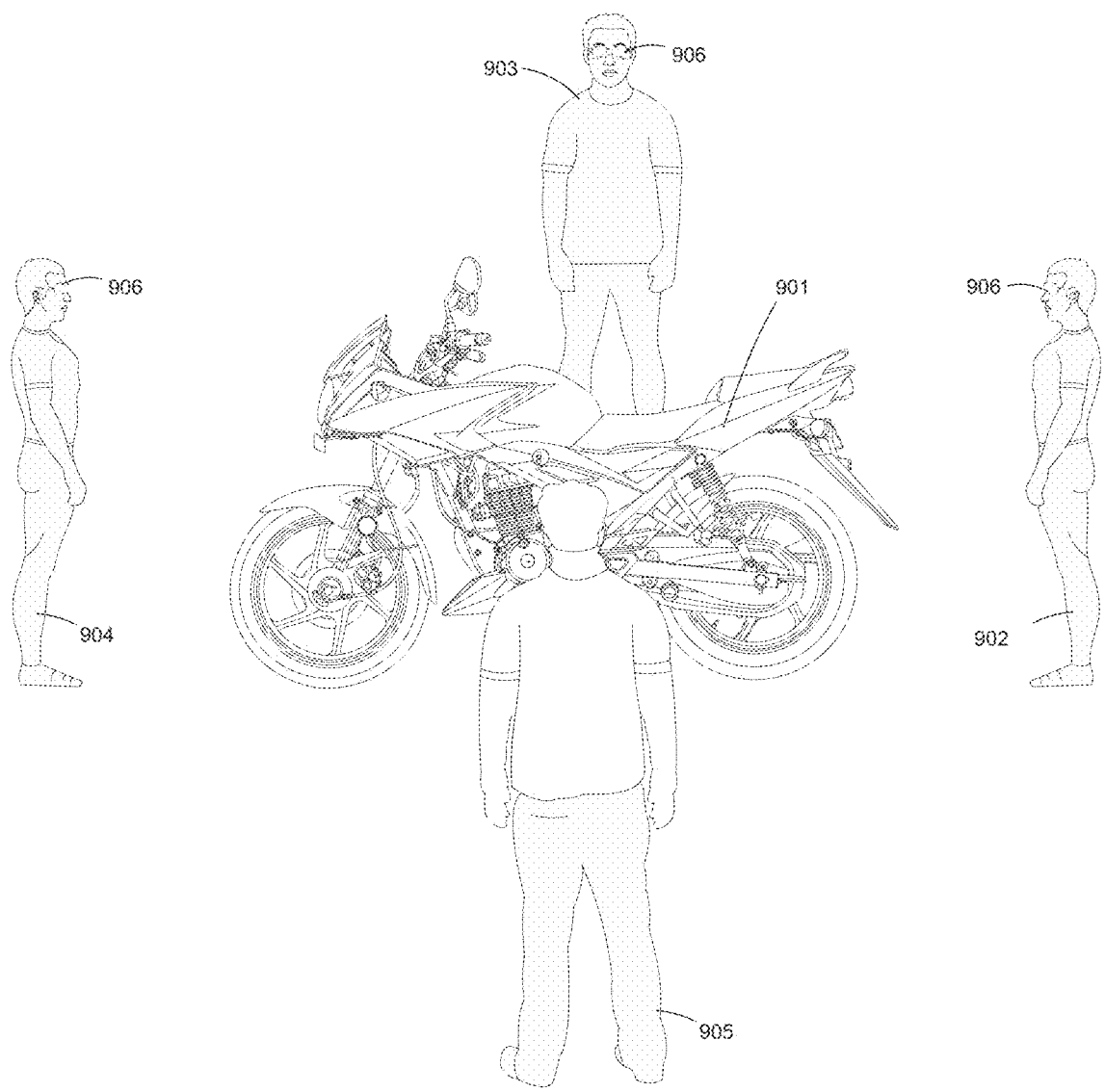
FIG. 9(a) to FIG. 9(e) illustrates an example of the invention where a man wearing a see-through head mount display (HMD) and customizing a motorcycle.
Figure 9B:
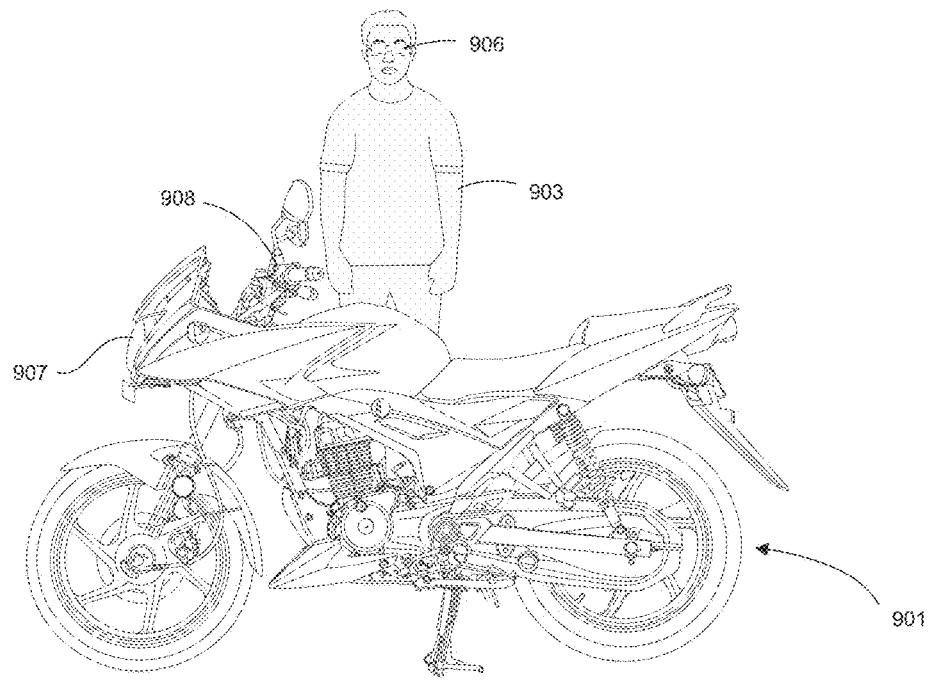
Figure 9C:
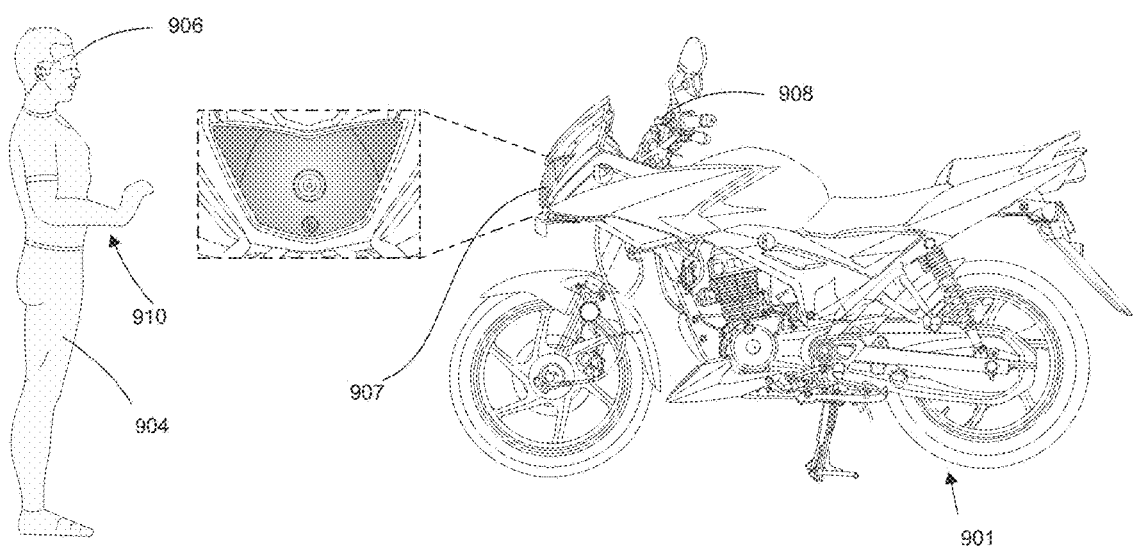
Figure 9D:
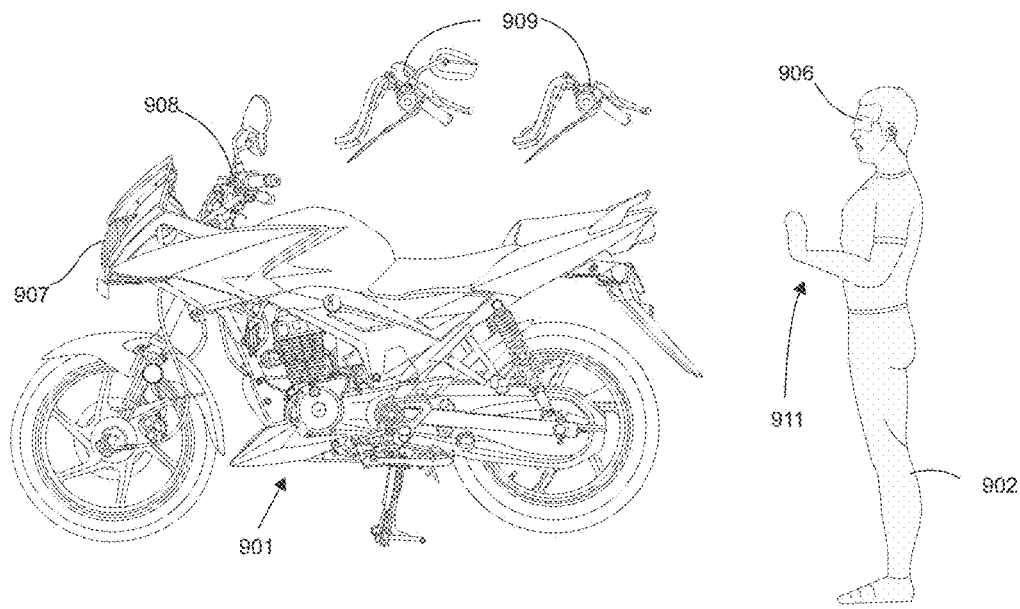
Figure 9E:
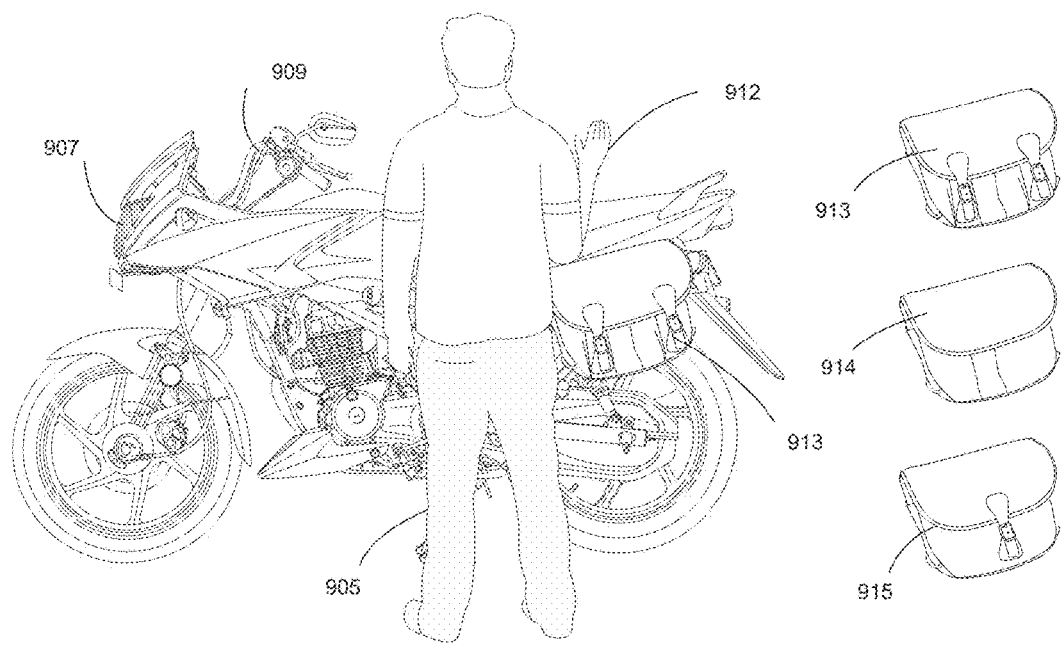

FIG. 9(a) to FIG. 9(e) illustrates an example of the invention where a man wearing a see-through head mount display (HMD) 906 and customizing a motorcycle 901. In FIG. 9(a), the man wears the see-through HMD 906 and moves at different locations 902, 903, 904, 905, and when the man moves the motorcycle 901 seems to be intact at one position. The man sees different parts of the virtual motorcycle 901, while moving to different locations 902, 903, 904, 905. In FIG. 9(b), the man moves to a first location 903, where the virtual motorcycle 901 remains intact at same position. In FIG. 9(c), at a second location 904, the man switches on headlight 907 of the virtual motorcycle 901 by pressing a button placed at handle 908 through gesture 910. However, the virtual motorcycle 901 remains intact at same position. In FIG. 9(d), the man moves to a third location 902, while the virtual motorcycle 901 remains intact at same position, and the man replaces the handle 908 with another handle 909 through gesture 911. In FIG. 9(e), the man moves to a fourth location 905, while the virtual motorcycle 901 remains intact at same position, and the man add a bag 913 at an appropriate place in the virtual motorcycle 901 from options 913, 914, 915 through gesture 912.

Figure 10A:
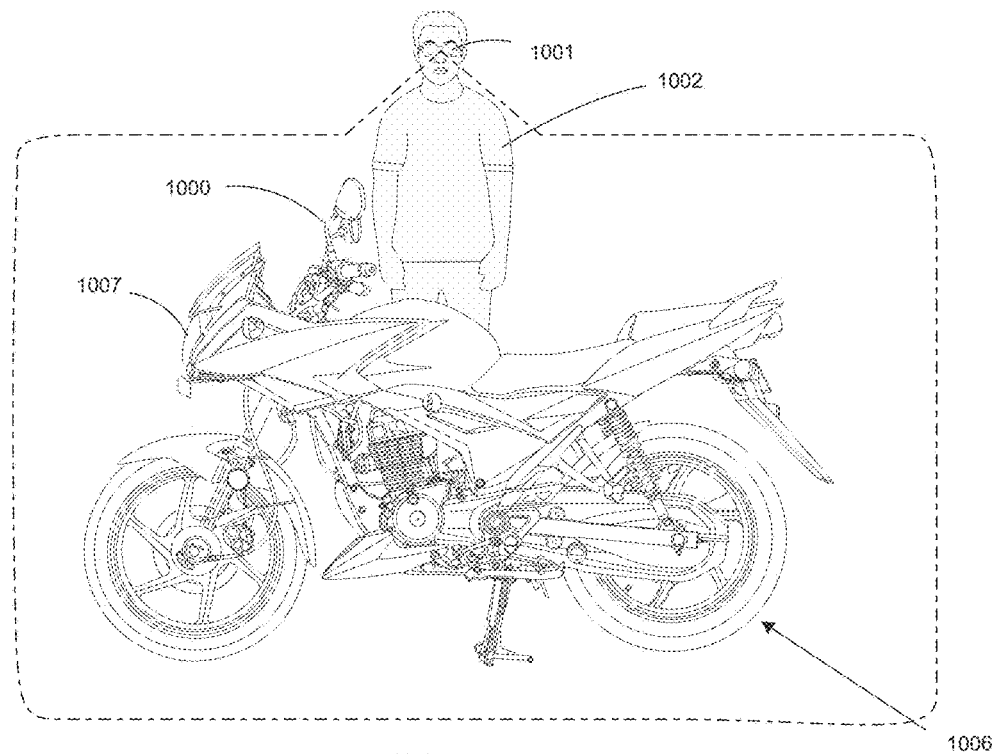
FIG. 10(a) to FIG. 10(d) illustrates an example of the invention where a man wearing an immersive head mount display (HMD) and customizing a motorcycle.
Figure 10B:
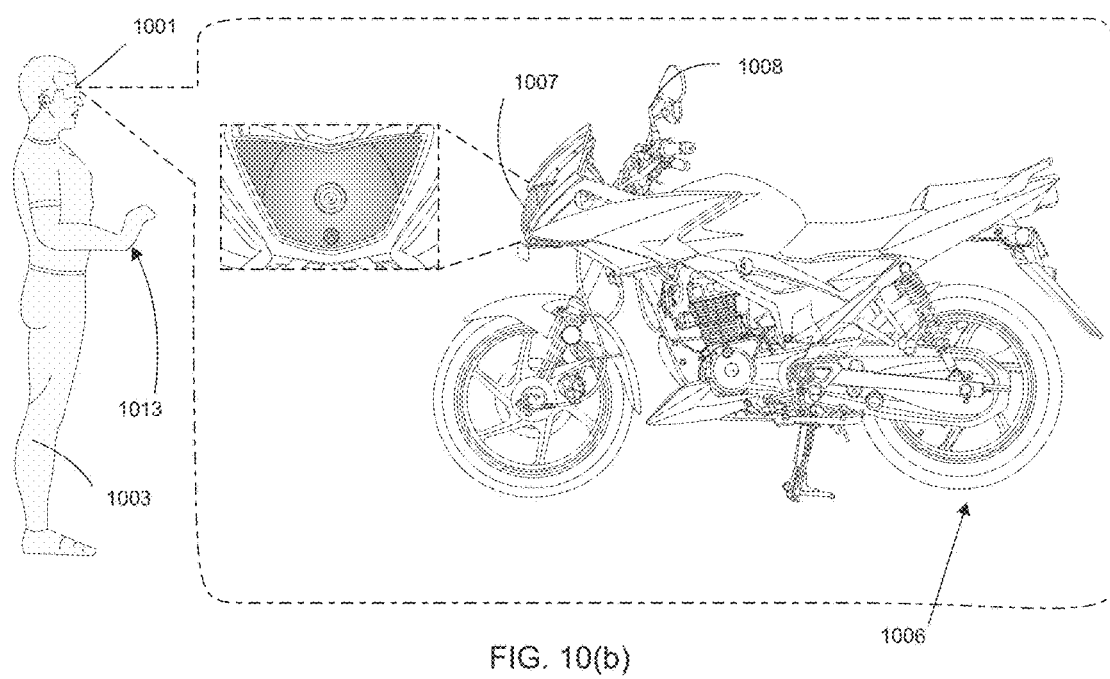
Figure 10C:
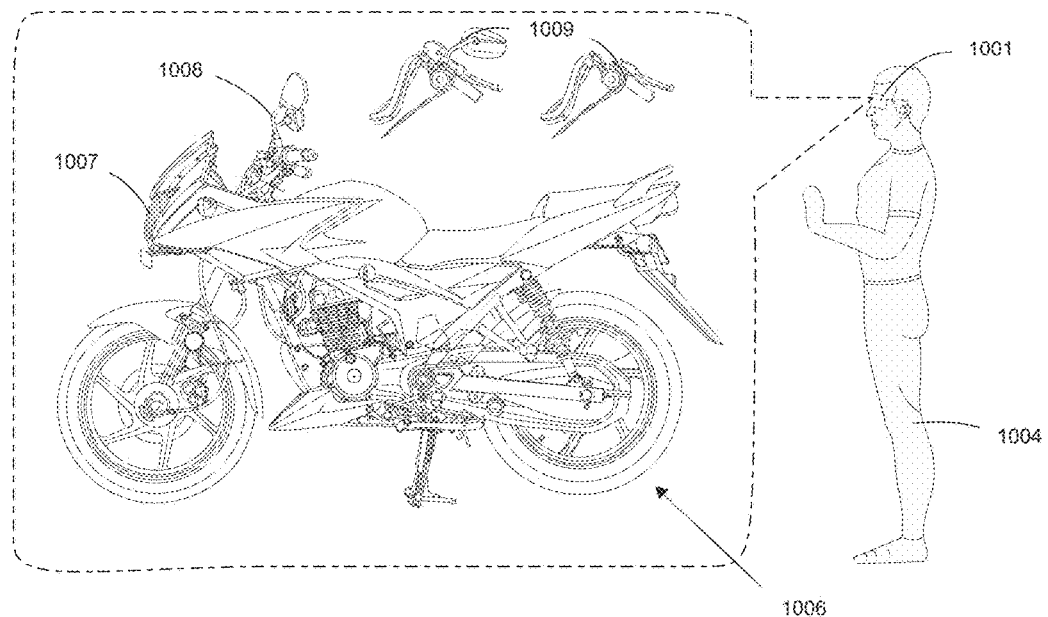
Figure 10D:
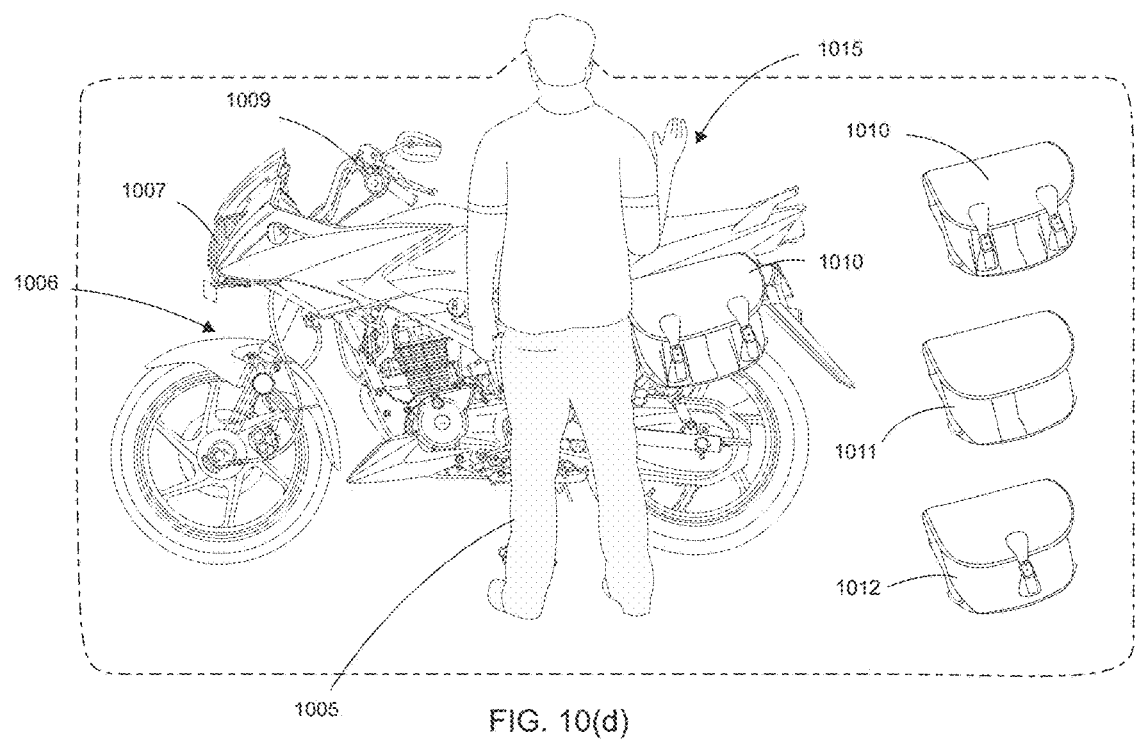

FIG. 10(a) to FIG. 10(d) illustrates an example of the invention where a man wearing an immersive head mount display (HMD) 1001 and customizing a motorcycle 1006. In FIG. 10(a), the man wears the immersive HMD 1001 and moves at different locations 1002, 1003, 1004, 1005, and when the man moves the motorcycle 1006 seems to be intact at one position. The man sees different parts of the virtual motorcycle 1006, while moving to different locations 1002, 1003, 1004, 1005. In FIG. 10(b), the man moves to a location 1003, where the virtual motorcycle 1006 remains intact at same position. In FIG. 10(b), at a location 1003, the man switches on headlight 1007 of the virtual motorcycle 1006 by pressing a button placed at handle 1008 through gesture 1013. However, the virtual motorcycle 1006 remains intact at same position. In FIG. 10(c), the man moves to a location 1004, while the virtual motorcycle 1006 remains intact at same position, and the man replaces the handle 1008 with another handle 1009 through gesture 1014. In FIG. 10(d), the man moves to a location 1005, while the virtual motorcycle 1006 remains intact at same position, and the man add a bag 1010 at an appropriate place in the virtual motorcycle 1006 from options 1010, 1011, 1012 through gesture 1015.

Figure 11A:
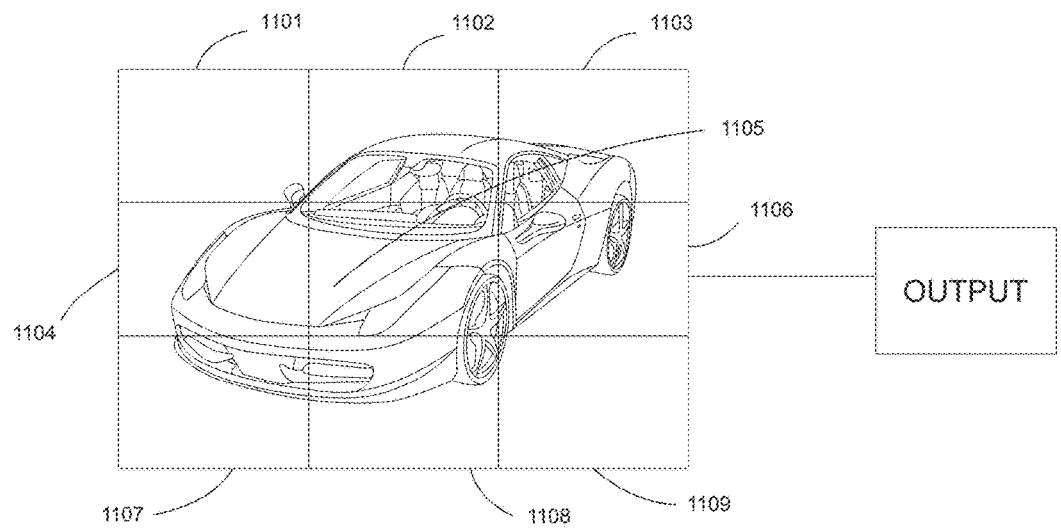
FIG. 11(a) and FIG. 11(b) illustrates an example of the invention where a 3D model is displayed on a video wall.
Figure 11B:
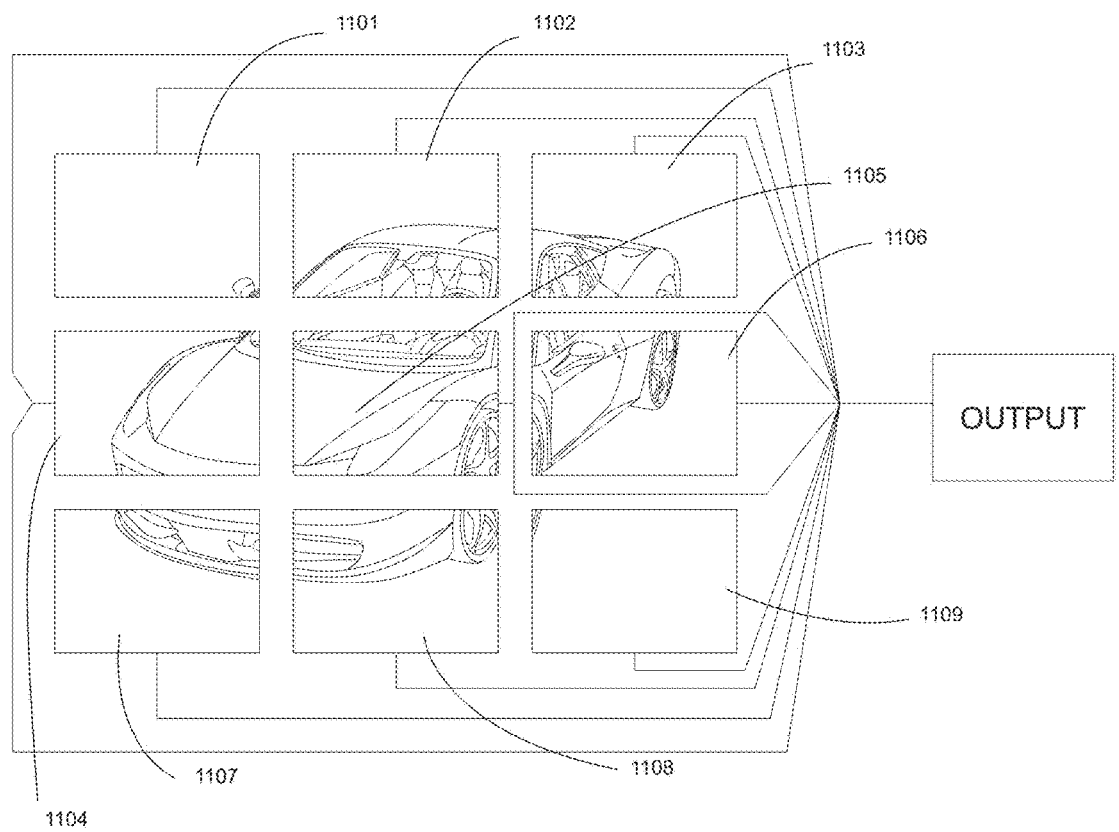

FIG. 11(a) illustrates an example of the invention where a 3D model is displayed on a video wall, wherein the video wall is connected to an output to receive the virtual object. Also interactions and customizations are shown on the video wall. FIG. 11(b) shows the video wall is made of multiple screens 1101, 1102, 1103, 1104, 1105, 1106, 1107, 1108, 1109, and receiving synchronized output regarding parts of the 3D model and interactive view of the parts of the 3D model, such that on consolidation of the screens, they behave as single screen to show interactive view of the 3D model.

Figure 12A:
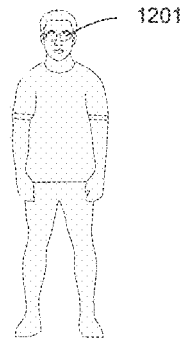
FIG. 12(a) to FIG. 12(f) illustrates an example of the invention where a man wearing a see-through head mount display (HMD) and customizing and interacting with a virtual refrigerator.
Figure 12B:
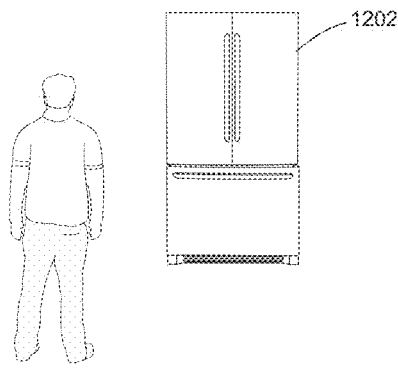
Figure 12C:
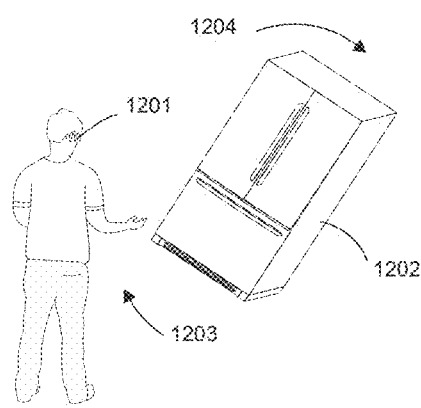
Figure 12D:
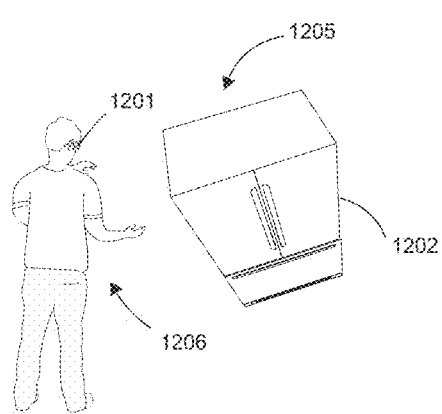
Figure 12E:
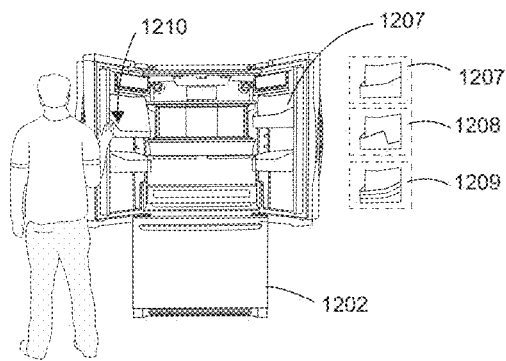
Figure 12F:
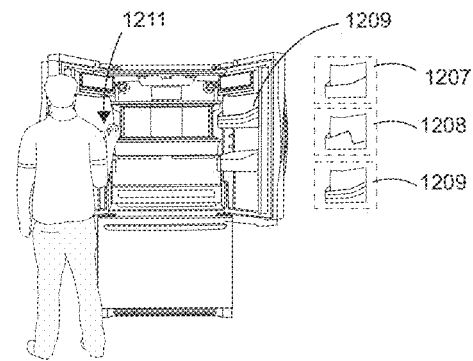

FIG. 12(a) to FIG. 12(f) illustrates an example of the invention where a man wearing a see-through head mount display (HMD) and customizing and interacting with a virtual refrigerator. In FIG. 12(a), a man is shown wearing see-through HMD 1201. In FIG. 12(b), the man request for viewing a virtual refrigerator 1202 and the refrigerator 1202 appears. In FIG. 12(c) and FIG. 12(d), the man rotates the refrigerator 1202 in 360 degrees to be in orientation 1204 and 1205, through gesture 1203, 1206 respectively. In FIG. 12(e), the man request for opening door of refrigerator 1202 through gesture 1210 and requests for options 1207, 1208, 1209 to change one of racks of the door of the refrigerator 1202. In FIG. 12(f), the man choose option 1209 by gesture 1211 to replace the rack 1207 of the door of the refrigerator 1202.

Figure 13A:
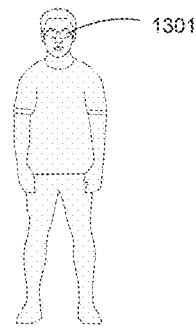
FIG. 13(a) to FIG. 13(f) illustrates an example of the invention where a man wearing an immersive head mount display (HMD) and customizing and interacting with a virtual refrigerator.
Figure 13B:
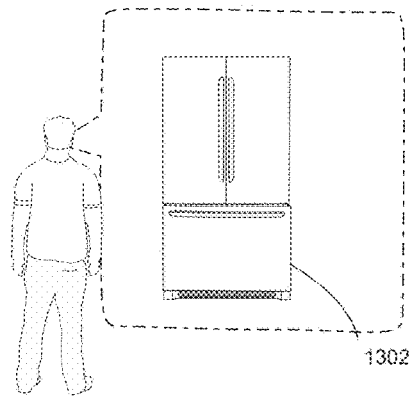
Figure 13C:
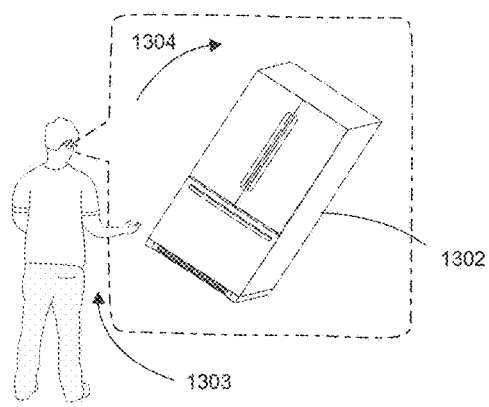
Figure 13D:
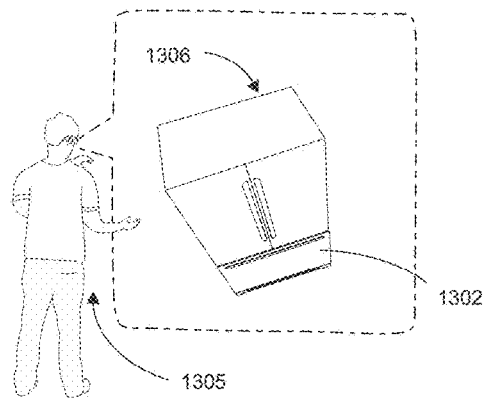
Figure 13E:
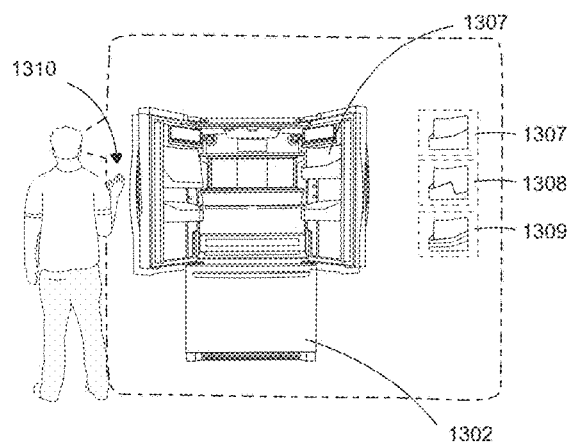
Figure 13F:
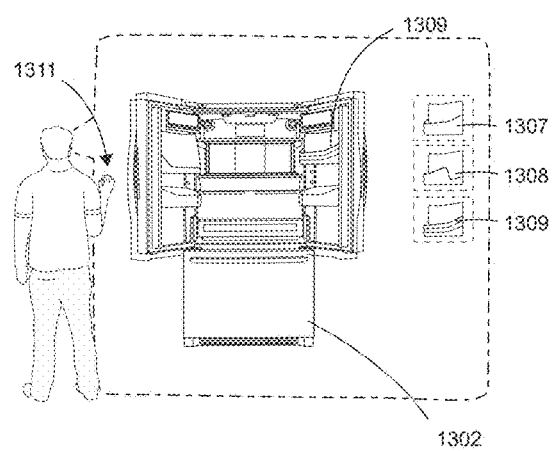

FIG. 13(a) to FIG. 13(f) illustrates an example of the invention where a man wearing an immersive head mount display (HMD) and customizing and interacting with a virtual refrigerator. In FIG. 13(a), a man is shown wearing immersive HMD 1301. In FIG. 13(b), the man request for viewing a virtual refrigerator 1302 and the refrigerator 1302 appears. In FIG. 13(c) and FIG. 13(d), the man rotates the refrigerator 1302 in 360 degrees to be in orientation 1304 and 1305, through gesture 1303, 1306 respectively. In FIG. 13(e), the man request for opening door of refrigerator 1302 through gesture 1310 and requests for options 1307, 1308, 1309 to change one of racks of the door of the refrigerator 1302. In FIG. 13(f), the man chooses option 1309 by gesture 1311 to replace the rack 1307 of the door of the refrigerator 1302.

Figure 14A:
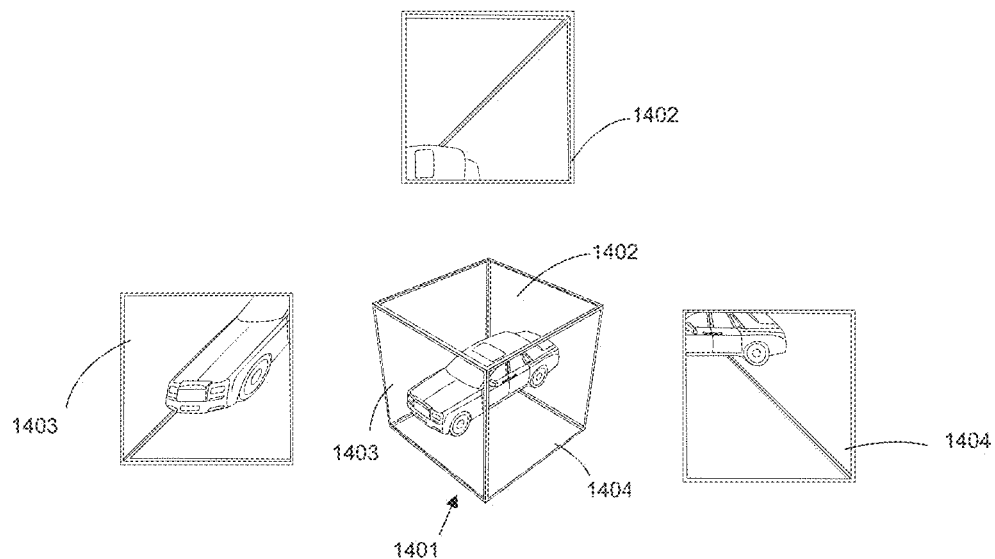
FIG. 14(a)-FIG. 14(d) illustrates an example of the invention where the 3D model is shown and interacted on a cube based display.
Figure 14B:
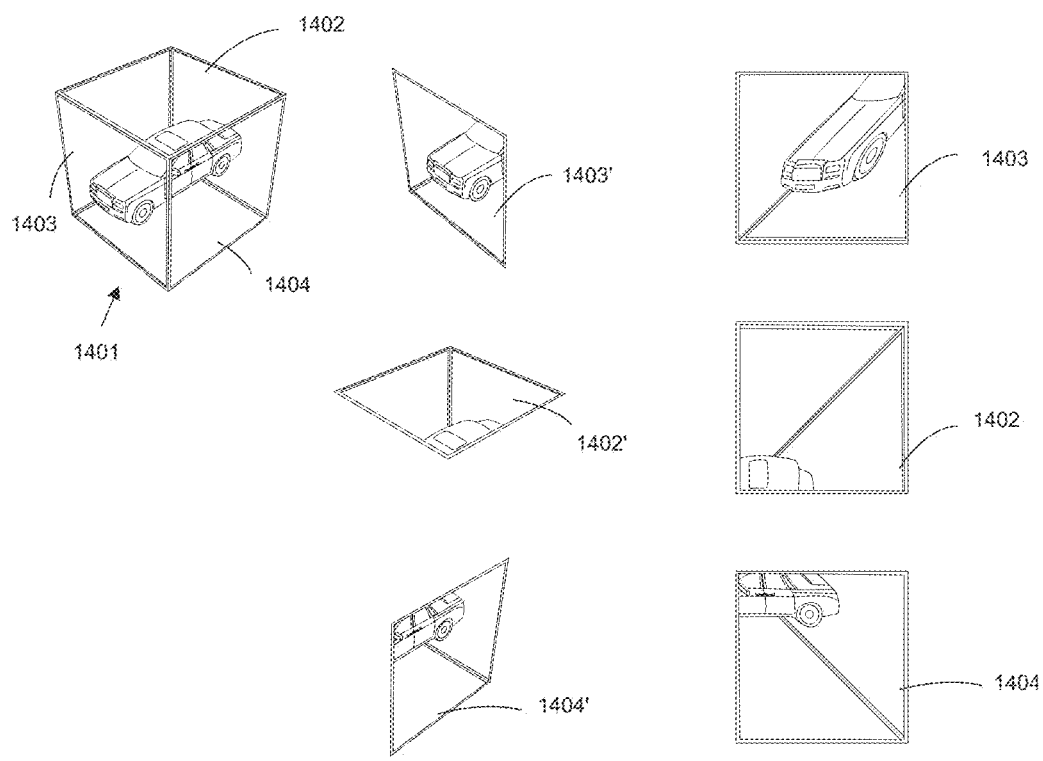
Figure 14C:
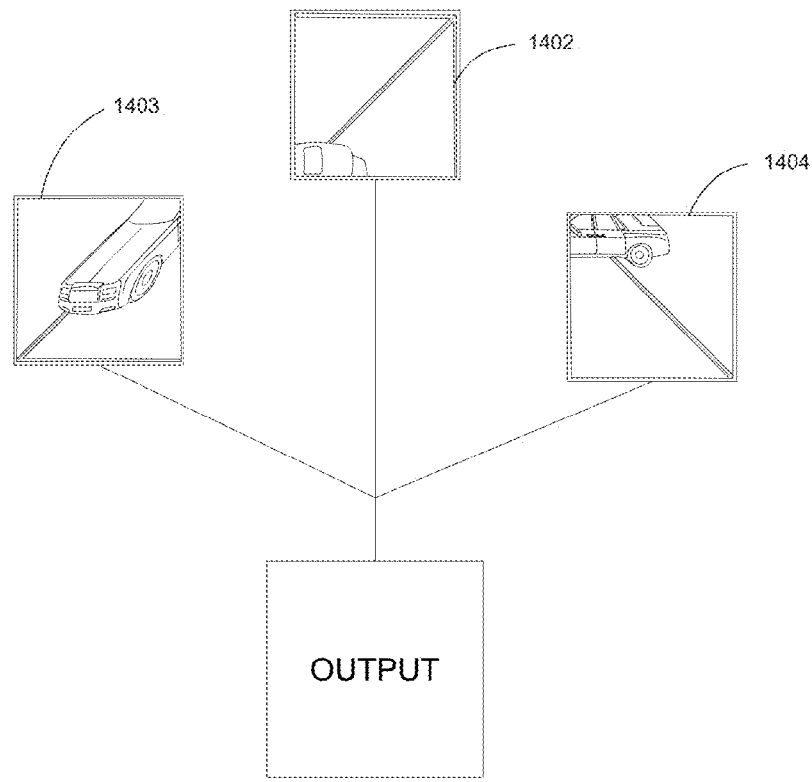
Figure 14D:
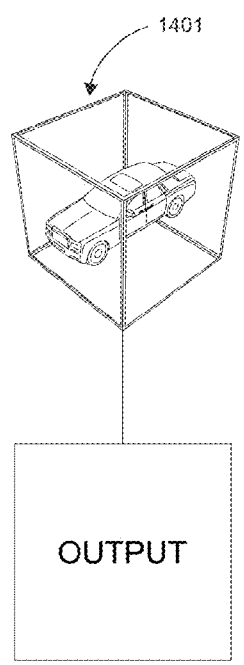

FIG. 14(a) to FIG. 14(d) illustrates an example of the invention where a cube based display 1401 is shown which is made of different electronic display 1402, 1403, 1404. User is seeing the car in cube 1401 which seems to be placed inside the cube due to projection while actually different screens are displaying different shape car parts. In FIG. 14(b), Rendering engine/s is parting the car image in the shape of 1403', 1402' and 1404' there after 1403', 1402', 1404' are skew to the shape of 1403, 1402 and 1404 respectively. FIG. 14(*c*), the output from rendering engine/s is going to different display/s in the form of 1403, 1402 and 1404. FIG. 14(*d*) shows the cube at particular orientation which gives illusion of car to be placed inside it and it can be customized by input using any input device.

Figure 15A:
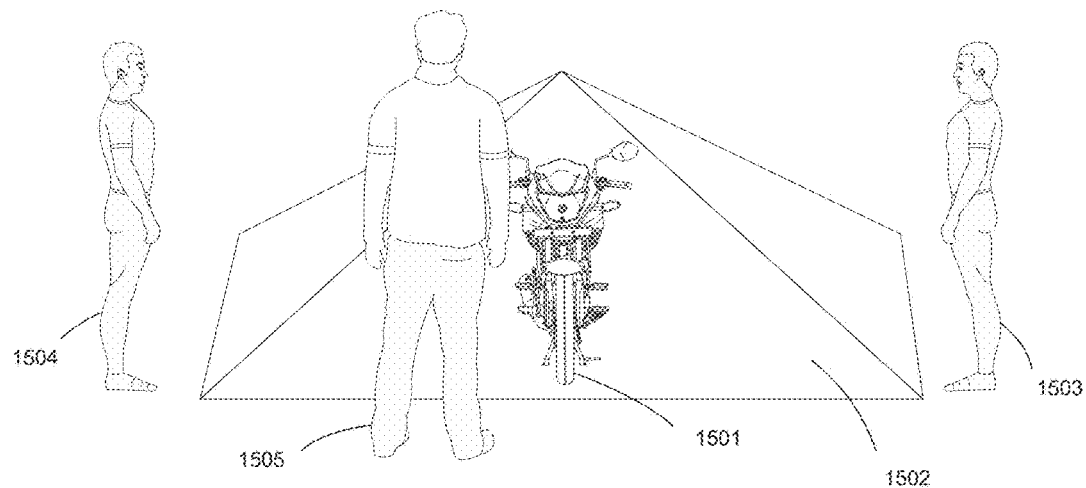
FIG. 15(a)-FIG. 15(c) illustrates an example of the invention where the 3D model is shown and interacted on a holographic display.
Figure 15B:
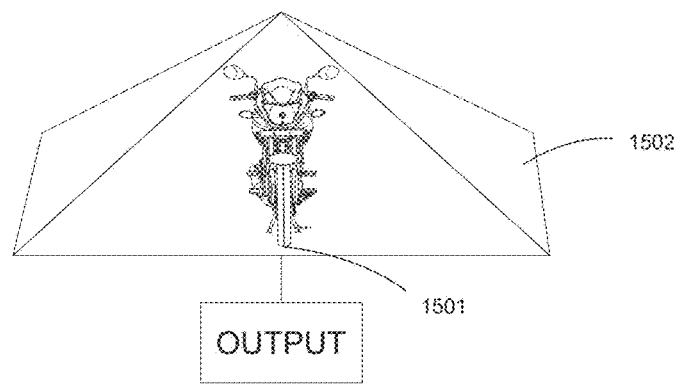
Figure 15C:
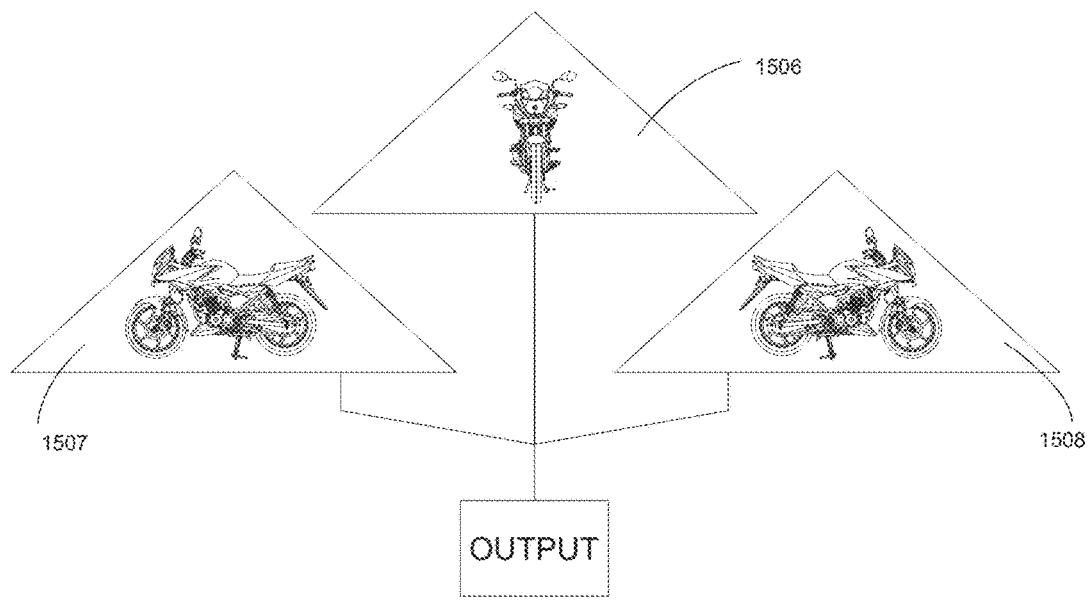

The Cube can be rotated in different orientation, where change in orientation will work as rotation scene in different plane in such a way at particular orientation of cube, particular image displayed so depending on the orientation, the image is cut into one piece, two piece or three piece. These different pieces wrap themselves to fit in different display in such a way so that the cube made of such display displays a single scene which gives a feeling that the object is inside the cube. Apart from cube, even hexagonal, pentagonal, sphere shaped display with same technique can show the 3D model of the object giving feel that the 3D model is inside the display FIG. 15(*a*) shows a display system 1502 made of multiple display based on pepper's ghost technique. It is showing bike 1501. User see the bike from different positions 1503, 104 and 1505. FIG. 15(*b*) show the display system 1502 is connected to the output and showing bike 1501. FIG. 15(*c*) show that the display system 1501 show different face of bike in different display 1507, 1506 and 1508 giving an illusion of a 3d bike standing at one position showing different face from different side.

Figure 16:
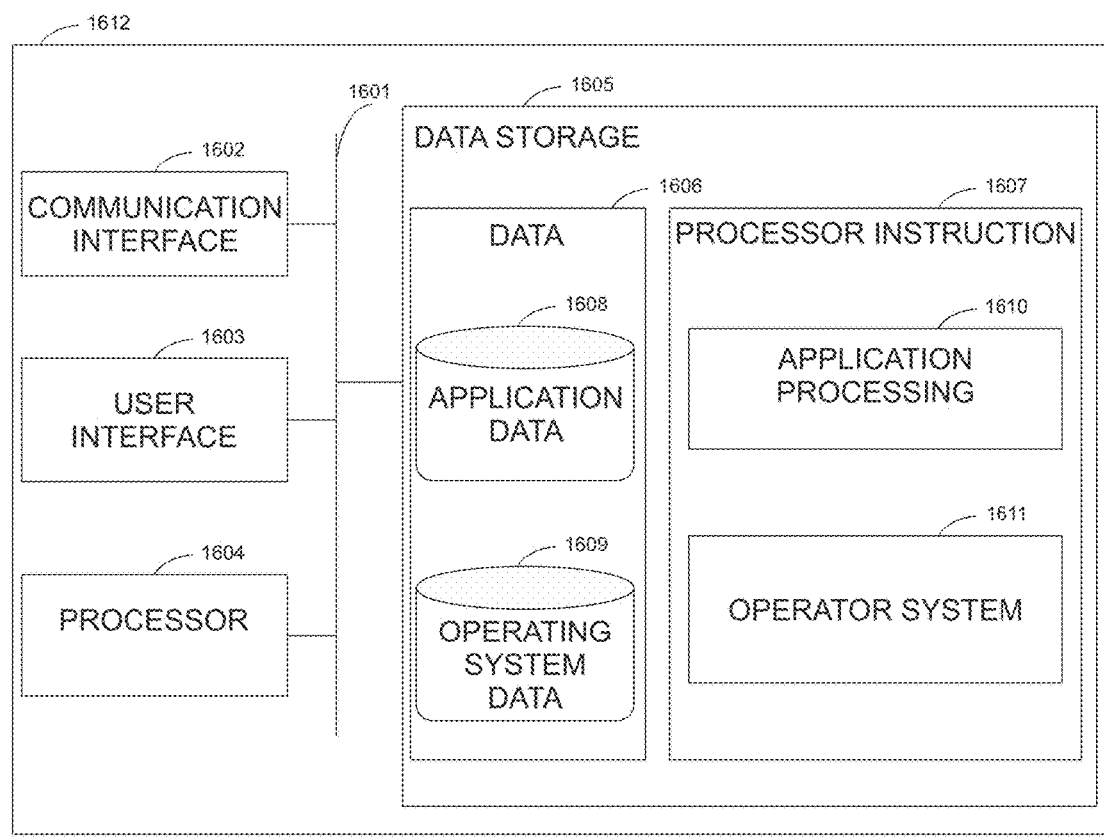
FIG. 16 illustrates a block diagram of the system implementing the invention.

FIG. 16 is a simplified block diagram showing some of the components of an example client device 1612. By way of example and without limitation, client device is a computer equipped with one or more wireless or wired communication interfaces.

As shown in FIG. 16, client device 1612 may include a communication interface 1602, a user interface 1603, a processor 1604, and data storage 1605, all of which may be communicatively linked together by a system bus, network, or other connection mechanism.

Communication interface 1602 functions to allow client device 1612 to communicate with other devices, access networks, and/or transport networks. Thus, communication interface 1602 may facilitate circuit-switched and/or packet-switched communication, such as POTS communication and/or IP or other packetized communication. For instance, communication interface 1602 may include a chipset and antenna arranged for wireless communication with a radio access network or an access point. Also, communication interface 1602 may take the form of a wireline interface, such as an Ethernet, Token Ring, or USB port. Communication interface 1602 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 102 Furthermore, communication interface 1502 may comprise multiple physical communication interfaces (e.g., a Wifi interface, a BLUETOOTH® interface, and a wide-area wireless interface).

User interface 1603 may function to allow client device 1612 to interact with a human or non-human user, such as to receive input from a user and to provide output to the user. Thus, user interface 1603 may include input components such as a keypad, keyboard, touch-sensitive or presence-sensitive panel, computer mouse, joystick, microphone, still camera and/or video camera, gesture sensor, tactile based input device. The input component also includes a pointing device such as mouse; a gesture guided input or eye movement or voice command captured by a sensor, an infrared-based sensor; a touch input; input received by changing the positioning/orientation of accelerometer and/or gyroscope and/or magnetometer attached with wearable display or with mobile devices or with moving display; or a command to a virtual assistant.

User interface 1603 may also include one or more output components such as a cut to shape display screen illuminating by projector or by itself for displaying objects, cut to shape display screen illuminating by projector or by itself for displaying virtual assistant.

User interface 1603 may also be configured to generate audible output(s), via a speaker, speaker jack, audio output port, audio output device, earphones, and/or other similar devices, now known or later developed. In some embodiments, user interface 1603 may include software, circuitry, or another form of logic that can transmit data to and/or receive data from external user input/output devices. Additionally or alternatively, client device 112 may support remote access from another device, via communication interface 1602 or via another physical interface.

Processor 1604 may comprise one or more general-purpose processors (e.g., microprocessors) and/or one or more special purpose processors (e.g., DSPs, CPUs, FPUs, network processors, or ASICs).

Data storage 1605 may include one or more volatile and/or non-volatile storage components, such as magnetic, optical, flash, or organic storage, and may be integrated in whole or in part with processor 1604. Data storage 1605 may include removable and/or non-removable components.

In general, processor 1604 may be capable of executing program instructions 1607 (e.g., compiled or non-compiled program logic and/or machine code) stored in data storage 1505 to carry out the various functions described herein. Therefore, data storage 1605 may include a non-transitory computer-readable medium, having stored thereon program instructions that, upon execution by client device 1612, cause client device 1612 to carry out any of the methods, processes, or functions disclosed in this specification and/or the accompanying drawings. The execution of program instructions 1607 by processor 1604 may result in processor 1604 using data 1606.

By way of example, program instructions 1607 may include an operating system 1611 (e.g., an operating system kernel, device driver(s), and/or other modules) and one or more application programs 1610 installed on client device 1612 Similarly, data 1606 may include operating system data 1609 and application data 1608. Operating system data 1609 may be accessible primarily to operating system 1611, and application data 1608 may be accessible primarily to one or more of application programs 1610. Application data 1608 may be arranged in a file system that is visible to or hidden from a user of client device 1612.

Application Data 1608 includes 3D model data that includes two-dimensional and/or three dimensional graphics data, texture data that includes photographs, video, interactive user controlled video, color or images, and/or audio data, and/or virtual assistant data that include video and audio. The graphics data comprises the 3d graphics data of 3D model without those part/s which are to be customized, 3D graphics data of the part/s of 3d model which are used during customization and/or 3d graphics data of complete 3D model.

Figure 17:
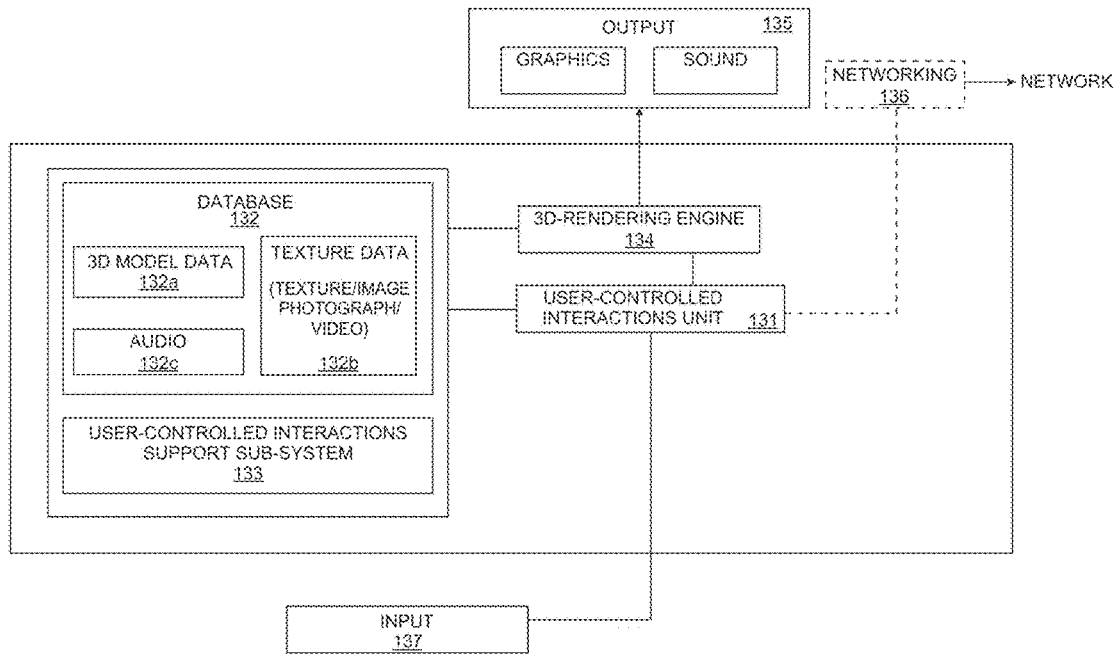
FIG. 17(a)-FIG. 17(b) illustrates a block diagram of another embodiment of the system implementing the invention.
Figure 17:
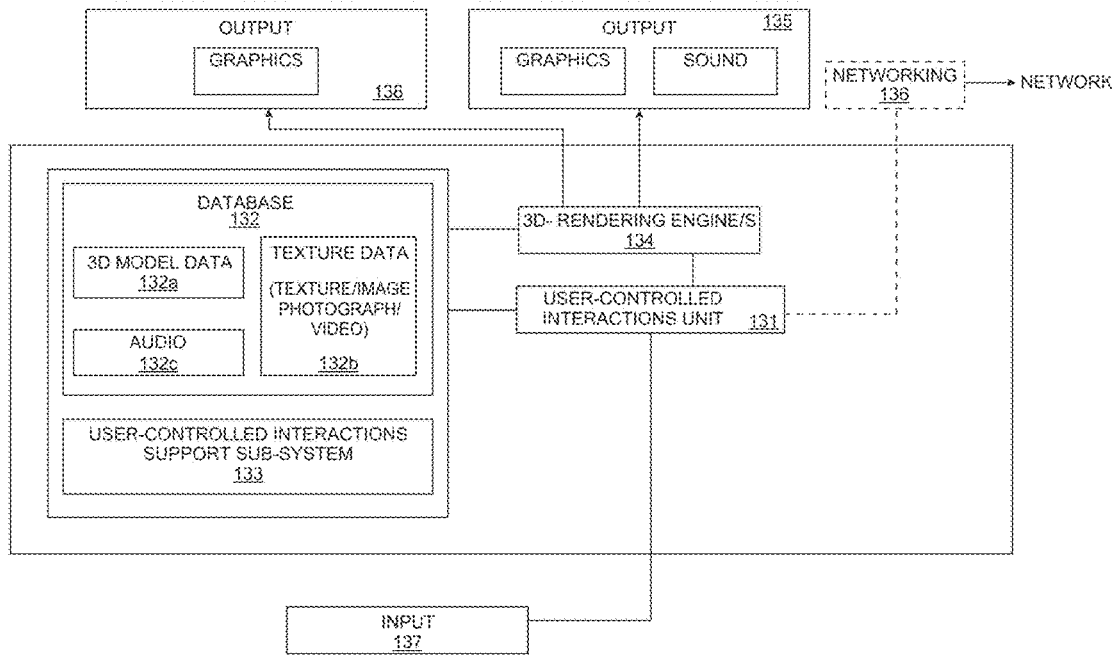

In one embodiment as shown in FIG. 17(*a*), the user controlled interaction unit 131 uses 3D model graphics data/wireframe data 132*a*, texture data 132*b*, audio data 132*c* along with user controlled interaction support sub-system 133 to generate the output 135, as per input request for interaction 137, using rendering engine 134. If some part is customized using another part then the interaction between part which is being customized and rest of the part is mapped to new part and rest of the part to make customized 3d model accessible for all interactions.

In another embodiment as shown in FIG. 17(*b*), sometime when multi-display system is used to show output 135, 138 then more than one rendering engines 134 using one or more than one processing units 131 may be used to generate separate output 135, 138 which goes to different display.

Customization can be done while the part/s of 3d model can be interacted after or before the customization happening.

According to another embodiment, where all those part/s which can be customized by removing or replacing by other options, the 3D model data of an object is having 3D graphics data and associated texture data of all customization options of part/s. When a customization request is made, the mesh and texture appears for that particular customization option only, while the mesh and texture of other customization options are being hidden. In another case 3D model of object is made up of many parts, and which is shown by joining different parts with appropriate texture. And, in such scenario, if a customization request is made, specific parts are changed to effectuate that particular customization. The 3D model so generated, can be further interacted with various other interactions as disclosed in this disclosure.

The user-controlled interactions unit 131 includes logic customization such as choosing texture and 3d data to load and customize part/s for rendering engine to render the output. User controlled unit 131 also keep logic/instruction to generate response using rendering engine as per getting user input for different interaction of part/s of 3d model by using 132 & 133. These logic are, for performing extrusive and intrusive interactions, for performing liquid and fumes flow interactions, for performing addition interactions, for performing deletion interactions, for performing time-bound changes based interactions, for performing environment mapping based interactions, for performing interaction for getting un-interrupted view of internal parts using transparency-opacity effect, for performing immersive interactions, for performing inter-interactions, for performing engineering disintegration interactions with the displayed 3D model. The user control interaction unit 131 is the main logic that utilizes different sub-system 133, database 132, and according to user input generates output and a corresponding scene or user-controlled interaction response is rendered using a 3D rendering engine in real time/near real time.

The texture data 132*b* includes textures obtained from photographs, use of video file as texture, color or images. Texture data include texture for 3D model and its functioning surfaces such as for showing the function of digital/electronic part. 3D model can be textured using computer generated colors, brightness, hue, shades as well. It may be added in 3d model generation environment or during the rendering by using libraries for color, shades or other properties which are associated with rendering engine. For providing realistic look texture may be prepared from real photographs, images, videos. Video is used as texture in the 3D model only for that surface/s which corresponds to functioning part such as light-emitting parts in the real object. The use of video enhances reality in displaying dynamic texture changes for function part for lighting effect (one of extrusive and intrusive interactions). Multiple textures pre-calibrated on 3D model UV layouts can be stored as texture data for one/same surface in the database 132, which are called for or fetched dynamically by the user-controlled interaction unit 131 during the user-controlled interactions.

According to another embodiment for the texturing of a three-dimensional 3D model of a 3D object using photograph and/or video, the method comprising:

using plurality of photographs and/or video of the real 3D object and/or the real 3D object's variants, where said photographs and/or video are used as texture data;

(a). selecting one or more surfaces of one or more external and/or internal parts of the 3D model;

(b). carrying out UV unwrap of selected surface/s of the 3D model for generating UV layout for each selected surface;

(c). identifying texture data corresponding to each UV layout, and applying one or more identified photographs and/or video as texture data on each corresponding UV layout, while performing first calibration for photographs and/or first calibration for video;

(d). after first calibration and for the selected surface/s, joining or adjacently placing all UVs of related UV layouts comprising first calibrated texture to form texture for the selected surface/s, while performing second calibration; and (e). repeating steps (a) to (d) until all chosen external and/or internal surfaces of the 3D model are textured using photographs and/or video, while at the joining of surfaces of different set of the selection of surfaces, applying third calibration for making seamless texture during each repetition step, wherein the calibrated textures and corresponding 3D-model is stored as texture data and 3D-model data respectively for use in user-controlled interactions implementation, wherein video is used as a texture in the 3D model for surfaces corresponding to functioning parts in real object, and for surfaces whose texture changes dynamically during operation of said functioning parts, and wherein at least one of the above steps is performed on a computer.

The user-controlled interaction support sub-system 133 includes a sound engine for producing sound as per user-controlled interaction, a motion library responsible for animation of one or more parts in the 3D model such as rotating the wheel continually. The virtual operating sub-system for providing functionality of operation of electronic or digital parts in the displayed 3D-model/s depending on the characteristics, state and nature of displayed object. It stores the functionality of GUI look and output for different input via 3D model part/s or GUI itself or other kind of inputs and also make response for different input of GUI to make a response for part/parts of 3D model or other GUI based output, an Artificial Intelligence (AI) engine for decision making and prioritizing user-controlled interactions response, a scene graph for primarily for putting more than one 3D object in scene say more than two 3D model of bikes, one bike or one 3D model etc, a terrain generator for generating surrounding, in case say 3D model is placed in some environment, lighting and shadow for generating the effect of light of 3D model, a shader for providing visual effects such as colour shades, and a physics/simulation engine for generating simulation effect, for example for showing the functioning of folding the roof of car, to show wrinkles in folding material.

According to another embodiment, for an example, "A user not only can customize the laptop looks and compare specification, but can understand the functionalities of laptop just in real life scenario such as switching it to judge start-up time, which is the real start-up time for the said product, if the product would have been started in real life set-up. The digital interaction/electronic display interaction is shown on some surface of 3D model. Here as the control when reach over the GUI of digital/electronic interaction surface, the control change and it goes from the 3D model to digital/electronic interaction layer for example; drag command to virtual mobile display goes to GUI but not to the 3D model which make change in GUI possible.

According to another embodiment, during mirror effect and immersive interactions, the user-controlled interactions unit 131 uses live video input from camera, which is directly passed to message handler. The message handler further transmits the input or interaction command to the user-controlled interactions unit 131 for identification and further processing.

Initially, user input can generate a network message, an operating system message, or is direct input. The network message means a command or event generated by the user input which is sent by server software to client software in same machine or any host connected through network for an action by the client. The operating system message is a command or event generated by user input by a device handler to the client software via operating system inter process communication/message queue/or an action by the client device. In the direct input or direct messaging, the device handler and the client software are a single application, hence commands or event are directly bound to the device handler. A message Interpreter interprets the message (command/event) based upon the context and calls the appropriate handler for an action. Message handler or event handler are logic blocks associated with an action for controls. User input can be provided using infrared based sensor, voice command based sensor, camera based sensor, or touch based screens.

Application Programs 1610 includes programs for performing the following steps, when executed over the processor:

generating and displaying a first view of the 3D model;
receiving an user input, the user input are one or more interaction commands, comprises interactions for customization of 3D model by at least one of adding, removing, replacing, scaling, or changing geometry, or combination thereof, of mechanical, electronic, digital, or pneumatic part/s of the 3D model by changing texture and/or graphics data of the part
identifying one or more interaction commands;
in response to the identified command/s, rendering of corresponding interaction to 3D model of object with or without sound output using texture data, computer graphics data and selectively using sound data of the 3D-model of object; and
displaying the corresponding interaction to 3D model.

Application program 1610 further includes a set of system libraries comprises functionalities for:

producing sound as per user-controlled interaction;
animation of one or more parts in the 3D model;
providing functionality of operation of electronic or digital parts in the displayed 3D model/s depending on the characteristics, state and nature of displayed object;
decision making and prioritizing user-controlled interactions response;
putting more than one 3D model/s in scene;
generating surrounding or terrain around the 3D model;
generating effect of dynamic lighting on the 3D model;
providing visual effects of color shades; and
generating real-time simulation effect;

Rendering of corresponding interaction to 3D model of object in a way for displaying in a display system made of one or more electronic visual display or projection based display or combination thereof.

The display system can be a wearable display or a non-wearable display or combination thereof.

The non-wearable display includes electronic visual displays such as LCD, LED, Plasma, OLED, video wall, box shaped display or display made of more than one electronic visual display or projector based or combination thereof.

The non-wearable display also includes a pepper's ghost based display with one or more faces made up of transparent inclined foil/screen illuminated by projector/s and/or electronic display/s wherein projector and/or electronic display showing different image of same virtual object rendered with different camera angle at different faces of pepper's ghost based display giving an illusion of a virtual object placed at one places whose different sides are viewable through different face of display based on pepper's ghost technology.

The wearable display includes head mounted display. The head mount display includes either one or two small displays with lenses and semi-transparent mirrors embedded in a helmet, eyeglasses or visor. The display units are miniaturised and may include CRT, LCDs, Liquid crystal on silicon (LCos), or OLED or multiple micro-displays to increase total resolution and field of view.

The head mounted display also includes a see through head mount display or optical head-mounted display with one or two display for one or both eyes which further comprises curved mirror based display or waveguide based display. See through head mount display are transparent or semi transparent display which shows the 3D model in front of users eye/s while user can also see the environment around him as well.

The head mounted display also includes video see through head mount display or immersive head mount display for fully 3D viewing of the 3D-model by feeding rendering of same view with two slightly different perspective to make a complete 3D viewing of the 3D-model. Immersive head mount display shows 3D model in virtual environment which is immersive.

In one embodiment, the 3D model moves relative to movement of a wearer of the head-mount display in such a way to give to give an illusion of 3D model to be intact at one place while other sides of 3D model are available to be viewed and interacted by the wearer of head mount display by moving around intact 3D model.

The display system also includes a volumetric display to display the 3D model and interaction in three physical dimensions space, create 3-D imagery via the emission, scattering, beam splitter or through illumination from well-defined regions in three dimensional space, the volumetric 3-D displays are either auto stereoscopic or auto multiscopic to create 3-D imagery visible to an unaided eye, the volumetric display further comprises holographic and highly multiview displays displaying the 3D model by projecting a three-dimensional light field within a volume.

The input command to the said virtual assistant system is a voice command or text or gesture based command. The virtual assistant system includes a natural language processing component for processing of user input in form of words or sentences and artificial intelligence unit using static/dynamic answer set database to generate output in voice/text based response and/or interaction in 3D model.

Other types of user controlled interactions are as follows:
interactions for colour change of displayed 3D model, operating movable external parts of the 3D model,
operating movable internal parts of the 3D model,
interaction for getting un-interrupted view of interior or accessible internal parts of the 3D model,
transparency-opacity effect for viewing internal parts and different parts that are inaccessible,
replacing parts of displayed object with corresponding new parts having different texture,
interacting with displayed object having electronic display parts for understanding electronic display,
operating system functioning, vertical tilt interaction and/or horizontal tilt interaction,
operating the light-emitting parts of 3D model of object for functioning of the light emitting parts,
interacting with 3D model for producing sound effects,
engineering disintegration interaction with part of the 3D model for visualizing the part within boundary of the cut-to-screen, the part is available for visualization only by dismantling the part from the entire object,
time bound change based interactions to represent of changes in the 3D model demonstrating change in physical property of object in a span of time on using or operating of the object,
physical property based interactions to a surface of the 3D model, wherein physical property based interactions are made to assess a physical property of the surface of the 3D model
real environment mapping based interaction, which includes capturing an area in vicinity of the user, mapping and simulating the video/image of area of vicinity on a surface of the 3D model
addition based interaction for attaching or adding a part to the virtual model,
deletion based interaction for removing a part of 3D model,
interactions for replacing the part of the 3D model,
demonstration based interactions for requesting demonstration of operation of the part/s of the object which are operated in an ordered manner to perform a particular operation,
linked-part based interaction, such that when an interaction command is received for operating one part of 3D model, than in response another part linked to the operating part is shown operating in the 3D model along with the part for which the interaction command was received,
liquid and fumes flow based interaction for visualizing liquid and fumes flow in the 3D model with real-like texture in real-time
immersive interactions, where users visualize their own body performing user-controlled interactions with the virtual computer model.

The displayed 3D model is preferably a life-size or greater than life-size representation of real object.

I claim:

1. A computer implemented method for visualization of a 3D model of an object, the method comprising:
   rendering and displaying the 3D-model
   receiving an user input, the user input are one or more interaction commands comprises interactions for customization of 3D model by at least one of adding, removing, replacing, scaling, or changing geometry, or combination thereof, of mechanical, electronic, digital, or pneumatic part/s of the 3D model by changing texture and/or graphics data of the part
   identifying one or more interaction commands;
   in response to the identified command/s, rendering of corresponding interaction to 3D model of object using texture data, and computer graphics data of the 3D-model of object; and
   displaying the corresponding interaction to 3D-model.

2. The method according to claim 1, wherein customization by adding comprises adding one or more new part/s to the 3D model at a predefined appropriate position.

3. The method according to claim 1 wherein customization by replacing and/or removing is performed on a predefined part/s.

4. The method according to claim 1 wherein customization by scaling is performed on a predefined part and/or to a predefined limit.

5. The method according to claim 1 wherein the part of 3D model can be customized by shape in particular geometry of predefined options.

6. The method according to claim 1 wherein the 3D-model after customization is adapted to behave as an entity, in the same way as the 3D model was behaving before customization, so as the 3D model after customization is viewable from all angles.

7. The method according to claim 1 wherein the customization is adapted to be performed in any angular orientation of the 3D model.

8. The method according to claim 1 wherein the interaction command comprises extrusive interaction and/or intrusive interactions and/or a time bound change based interaction and/or a real environment mapping based interaction and combination thereof, as per user choice and/or as per characteristics, state and nature of the said object,
   wherein the time bound changes refers to representation of changes in 3D model demonstrating change in physical property of object in a span of time on using or operating of the object, and real environment mapping refers to capturing a real time environment, mapping and simulating the real time environment to create a simulated environment for interacting with the 3D model.

9. The method according to claim 8, wherein the interaction commands are adapted to be received before customization and/or during customization and/or after customization.

10. The method according to claim 8 wherein the extrusive interaction comprises at least one of:
    interacting with a 3D model representing an object having a display for experiencing functionality of Virtual GUI on virtual display of displayed 3D model; to produce the similar changes in corresponding GUI of 3D model as in GUI of the object for similar input;
    interacting for operating and/or removing movable parts of the 3D model of the object, wherein operating the movable parts comprises sliding, turning, angularly moving, opening, closing, folding, and inflating-deflating the parts
    interacting with 3D model of object for rotating the 3D model in 360 degree in different planes;
    operating the light-emitting parts of 3D-model of object for experiencing functioning of the light emitting part/s, the functioning of the light emitting part/s comprises glowing or emission of the light from light emitting part/s in 3D-model in similar pattern that of light emitting part/s of the object;
    interacting with 3D-model of object having representation of electronic display part/s of the object to display response in electronic display part of 3D-model similar to the response to be viewed in electronic display part/s of the object upon similar interaction;

interacting with 3D-model of object having representation of electrical/electronic control of the object to display response in the 3D-model similar to the response to be viewed in the object upon similar interaction;

interacting with 3D-model for producing sound effects; or combination thereof.

11. The method according to the claim 10, wherein functioning of light emitting part is shown by a video as texture on surface of said light emitting part to represent lighting as dynamic texture change.

12. The method according to the claim 8 the intrusive interactions comprises at least one of:

interacting with sub-parts of the 3D-model of the object, wherein sub-parts are those parts of the 3D-model which are moved and/or slided and/or rotated and/or operated for using the object;

interacting with internal parts of the 3D model, wherein the internal parts of the 3D-model represent parts of the object which are responsible for working of object but not required to be interacted for using the object, wherein interacting with internal parts comprising removing and/or disintegrating and/or operating and/or rotating of the internal parts;

interacting for receiving an un-interrupted view of the interior of the 3D model of the object and/or the sub-parts;

interacting with part/s of the 3D model for visualizing the part by dismantling the part from the entire object;

interacting for creating transparency-opacity effect for converting the internal part to be viewed as opaque and remaining 3D model as transparent or nearly transparent;

disintegrating different parts of the object in exploded view; or combination thereof.

13. The method according to the claim 8 wherein the real environment mapping based interactions comprises at least one of:

capturing an area in vicinity of the user, mapping and simulating the video/image of area of vicinity on a surface of 3D model to provide a mirror effect;

capturing an area in vicinity of the user, mapping and simulating the video/image of area of vicinity on a 3D space where 3D model is placed; or combination thereof.

14. The method according to the claim 1 wherein the interaction comprises liquid and fumes flow based interaction for visualizing liquid and fumes flow in the 3D model with real-like texture in real-time.

15. The method according to the claim 1 wherein the interaction comprises immersive interactions, the immersive interactions are defined as interactions where users visualize their own body performing user-controlled interactions with the virtual computer model.

16. The method according to the claim 1 wherein displaying of new interaction/s to the 3D-model while previously one or more interaction has been performed or another interaction/s is being performed on the 3-D model.

17. The method according to the claim 1 wherein rendering of corresponding interaction to 3D model of object in a way for displaying in a display system made of one or more electronic visual display or projection based display or combination thereof.

18. The method according to the claim 17, wherein the display system is a wearable display or a non-wearable display or combination thereof, wherein the non-wearable display comprises electronic visual displays such as LCD, LED, Plasma, OLED, video wall, box shaped display or display made of more than one electronic visual display or projector based or combination thereof, wherein the non-wearable display comprises a pepper's ghost based display with one or more faces made up of transparent inclined foil/screen illuminated by projector/s and/or electronic display/s wherein projector and/or electronic display showing different image of same virtual object rendered with different camera angle at different faces of pepper's ghost based display giving an illusion of a virtual object placed at one places whose different sides are viewable through different face of display based on pepper's ghost technology, wherein the wearable display comprises head mounted display, the head mount display comprises either one or two small displays with lenses and semi-transparent mirrors embedded in a helmet, eyeglasses or visor, the display units are miniaturised and may include CRT, LCDs, Liquid crystal on silicon (LCos), or OLED or multiple micro-displays to increase total resolution and field of view, wherein the head mounted display comprises a see through head mount display or optical head-mounted display with one or two display for one or both eyes which further comprises curved mirror based display or waveguide based display, wherein the head mounted display comprises video see through head mount display or immersive head mount display for fully 3D viewing of the 3D-model by feeding rendering of same view with two slightly different perspective to make a complete 3D viewing of the 3D-model, wherein the 3D model moves relative to movement of a wearer of the head-mount display in such a way to give to give an illusion of 3D model to be intact at one place while other sides of 3D model are available to be viewed and interacted by the wearer of head mount display by moving around intact 3D model.

19. The method according to the claim 17, wherein the display system comprises a volumetric display to display the 3D model and interaction in three physical dimensions space, create 3-D imagery via the emission, scattering, beam splitter or through illumination from well-defined regions in three dimensional space, the volumetric 3-D displays are either auto stereoscopic or auto multiscopic to create 3-D imagery visible to an unaided eye, the volumetric display further comprises holographic and highly multiview displays displaying the 3D model by projecting a three-dimensional light field within a volume.

20. The method according to claim 17, wherein the display system comprises more than one electronic display/projection based display joined together at an angle to make an illusion of showing the 3D model inside the display system, wherein the 3D model is parted off in one or more parts, thereafter parts are skew in shape of respective display and displaying the skew parts in different displays to give an illusion of 3d model being inside display system.

21. The method according to claim 1, wherein the input command is received from one or more of a pointing device such as mouse; a keyboard; a gesture guided input or eye movement or voice command captured by a sensor, an infrared-based sensor; a touch input; input received by changing the positioning/orientation of accelerometer and/or gyroscope and/or magnetometer attached with wearable display or with mobile devices or with moving display; or a command to a virtual assistant.

22. The method according to claim 21 wherein command to the said virtual assistant system is a voice command or text or gesture based command, wherein virtual assistant system comprises a natural language processing component for processing of user input in form of words or sentences and artificial intelligence unit using static/dynamic answer set database to generate output in voice/text based response and/or interaction in 3D model.

23. A system of user-controlled realistic 3D simulation for enhanced object viewing and interaction experience comprising:
- one or more input devices;
- a display device;
- a computer graphics data related to graphics of the 3D model of the object, a texture data related to texture of the 3D model, which is stored in one or more memory units; and
- machine-readable instructions that upon execution by one or more processors cause the system to carry out operations comprising:
- rendering and displaying the 3D-model
- receiving an user input, the user input are one or more interaction commands comprises interactions for customization of 3D model by at least one of adding, removing, replacing, scaling, or changing geometry, or combination thereof, of mechanical, electronic, digital, or pneumatic part/s of the 3D model by changing texture and/or graphics data of the part
- identifying one or more interaction commands;
- in response to the identified command/s, rendering of corresponding interaction to 3D model of object using texture data, and computer graphics data of the 3D-model of object; and
- displaying the corresponding interaction to 3D-model.

24. A computer program product stored on a non-transitory computer readable medium and adapted to be executed on one or more processors, wherein the non-transitory computer readable medium and the one or more processors are adapted to be coupled to a communication network interface, the computer program product on execution to enable the one or more processors to perform following steps comprising:
- rendering and displaying the 3D-model
- receiving an user input, the user input are one or more interaction commands comprises interactions for customization of 3D model by at least one of adding, removing, replacing, scaling, or changing geometry, or combination thereof, of mechanical, electronic, digital, or pneumatic part/s of the 3D model by changing texture and/or graphics data of the part
- identifying one or more interaction commands;
- in response to the identified command/s, rendering of corresponding interaction to 3D model of object using texture data, and computer graphics data of the 3D-model of object; and
- displaying the corresponding interaction to 3D-model.

* * * * *